United States Patent
Miyazaki

(10) Patent No.: US 9,661,176 B2
(45) Date of Patent: May 23, 2017

(54) IMAGE FORMING APPARATUS, IMAGE FORMING SYSTEM, AND IMAGE FORMATION CONTROL METHOD

(71) Applicant: KONICA MINOLTA, INC., Chiyoda-ku, Tokyo (JP)

(72) Inventor: Ken Miyazaki, Sagamihara (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/815,136

(22) Filed: Jul. 31, 2015

(65) Prior Publication Data

US 2016/0044184 A1 Feb. 11, 2016

(30) Foreign Application Priority Data

Aug. 8, 2014 (JP) ................................. 2014-162254

(51) Int. Cl.
*H04N 1/00* (2006.01)
*H04N 1/04* (2006.01)
*H04N 1/40* (2006.01)

(52) U.S. Cl.
CPC ....... *H04N 1/0405* (2013.01); *H04N 1/00761* (2013.01)

(58) Field of Classification Search
CPC .......... H04N 1/00082; H04N 1/00045; H04N 1/00408; H04N 1/00761
USPC ........................................ 358/3.24, 1.9, 1.12
See application file for complete search history.

(56) References Cited

U.S. PATENT DOCUMENTS

2005/0286922 A1* 12/2005 Oki ...................... H04N 1/0058
399/75
2012/0081722 A1* 4/2012 Katayama ............ H04N 1/6033
358/1.9

FOREIGN PATENT DOCUMENTS

JP 2002023991 A 1/2002

* cited by examiner

*Primary Examiner* — Quang N Vo
(74) *Attorney, Agent, or Firm* — Holtz, Holtz & Volek PC

(57) ABSTRACT

Illustration image data drawn correspondingly to reading of an adjustment chart are memorized in a memory section, an adjustment chart is formed in a image mode in an image forming section, adjustment image data produced by reading the adjustment chart in an image reading section are analyzed, illustration image data corresponding to an analysis result of the adjustment image data are selected at the time of adjusting the image forming section based on the analysis result, and display data of the illustration image data are produced.

21 Claims, 20 Drawing Sheets

IMAGE FORMING APPARATUS, IMAGE FORMING SYSTEM, AND IMAGE FORMATION CONTROL METHOD

The present application claims the priority right under the Paris Convention based on Japanese Patent Application No. 2014-162254 filed on Aug. 8, 2014, in accordance with the provisions in the United States Patent Law.

BACKGROUND OF THE INVENTION

Field of the Invention

The present invention relates to an image forming apparatus, an image forming system, and an image formation control method. In particular, the present invention relates to a technique to handle an adjustment chart appropriately.

Description of Related Art

In an image forming apparatus which forms images on both sides of a sheet, depending on the intended use purpose of a resultant printed sheet of image formation, it is important that the respective positions of images on the both sides coincide with each other. For this reason, according an existing technique, a chart in which an exclusive pattern is formed on its both sides is output by an image forming apparatus. Then, an operator measures the respective positions of the charts on both sides, and inputs the measurement results from an operating section. Subsequently, the operator performs position adjustment for the both sides on the inside of the image forming apparatus.

However, in such an adjustment technique, measurement varies depending on operators, and measurement results are input erroneously. Accordingly, the influence of errors caused by operators becomes greater. Consequently, it has been difficult to perform position adjustment for both sides correctly.

On the other hand, according to another existing technique, in order to eliminate such an error caused by operators, an exclusive chart is read with a scanner, the read results are analyzed on the inside of an image forming apparatus, and then, position adjustment is performed for both sides. In this case, in order to eliminate the influence of reading errors of the scanner, it is necessary to read one end and the other end, in the long side direction, of the front surface of an exclusive chart and one end and the other end, in the long side direction, of the back surface of the exclusive chart at the same position of the scanner.

With regard to execution of position adjustment for both sides of a sheet by using an exclusive chart, in Japanese Unexamined Patent Publication No. 2002-23991 (Document 1), several propositions have been made.

SUMMARY OF THE INVENTION

As mentioned above, in an adjustment technique which reads an exclusive chart with a scanner and executes position adjustment for both sides of a sheet, it is necessary to read one end and the other end, in the long side direction, of the front surface of an exclusive chart and one end and the other end, in the long side direction, of the back surface of the exclusive chart at the same reading position of the scanner.

For that purpose, as one example, it is necessary to advance processing in accordance with the following reading steps of (1), (2), (3), and (4).

(1) Read one end of the front surface of an exclusive chart in the long side direction at a specific reading position of a scanner.

(2) Rotate the front surface of the exclusive chart by 180 degrees, and read the other end of the front surface of the exclusive chart in the long side direction at the same specific reading position of the scanner as that in the previous reading.

(3) Reverse the exclusive chart, and read one end of the back surface of the exclusive chart in the long side direction at the same specific reading position of the scanner as that in the previous reading.

(4) Rotate the back surface of the exclusive chart by 180 degrees, and read the other end of the back surface of the exclusive chart in the long side direction at the same specific reading position of the scanner as that in the previous reading.

If the reading position at the time of setting the exclusive chart deviates at any one step of the above (1) to (4), it is recognized that a deviation of an image formation position occurs in the exclusive chart. Accordingly, if unnecessary correction is performed, a position deviation occurs conversely.

Further, if the reading order at the time of setting the exclusive chart shifts, a deviation of an image formation position in the exclusive chart is recognized as a position deviation on another position. Accordingly, an original position deviation is not corrected, and unnecessary correction is performed at another position where there is no position deviation.

In Document 1 mentioned above, a message "Please do xx" is printed on the last page and the first page of a bundle of sheets by using an erasable ink. Then, with this printing, an operator is urged to place right sheets. However, a procedure of placing sheets is merely noticed beforehand, and no consideration is made for a countermeasure in the case where placement of sheets is not proper.

Further, in a technique of reading an adjustment chart with a scanner and performing a various kinds of adjustment, in the case where a malfunction occurs in placement of the adjustment chart, there also exists a technique to notify an operator by displaying an actual image of the adjustment chart read by the scanner.

That is, in the above case, an image derived from the result of the malfunction on the surface read by the scanner is displayed. However, it may be difficult for the operator at the time of seeing the image to instantly intuitively understand how to eliminate the malfunction. As a result, there is a problem that the malfunction on the reading of the adjustment chart cannot be eliminated.

An object of the present invention is to make it possible to read an adjustment chart appropriately in the case of reading the adjustment chart and performing the various kinds of adjustment of an image forming apparatus.

(1) An image forming apparatus which reflects one aspect of the present invention includes an image forming section which performs image formation based on image data, a control section which controls the image formation in the image forming section, and a memory section which memorizes illustration image data drawn correspondingly to reading of an adjustment chart, wherein the control section controls so as to perform image formation for the adjustment chart in the image forming section, to analyze adjustment image data produced by reading the adjustment chart in an image reading section, to select illustration image data corresponding to an analysis result of the adjustment image data at the time of adjusting the image forming section based on the analysis result, and to produce display data of the illustration image data.

(2) In the above (1), at the time of executing a series of adjustment by reading multiple places on the adjustment chart separately by multiple times by the control of the control section, if the analysis result of the adjustment image data is normal, the control section control so as to select illustration image data corresponding to the next reading, and produces display data of the illustration image data, and if the analysis result of the adjustment image data is an error, the control section controls so as to select the illustration image data corresponding to the next rereading of the same portion, and produces display data of the illustration image data.

(3) In the above (1) to (2), the memory section memorizes the illustration image data with which an opposite surface opposite to a read surface of the adjustment chart is drawn as an illustration.

(4) In the above (1) to (3), the memory section memorizes the illustration image data with which a part of an opposite surface opposite to a read surface of the adjustment chart is drawn as an illustration by being emphasized.

(5) In the above (1) to (4), in the case where an error is detected by analyzing the adjustment image data, the control section controls so as to read out from the memory section the illustration image data with which a situation of the reading of the adjustment chart is drawn as an illustration so as to eliminate the error, and to produce display data of the illustration image data.

(6) In the above (1) to (5), the adjustment image data are produced by the image reading section by reading the adjustment chart output by image formation in the image forming section.

(7) In the above (1) to (6), at the time of executing a series of adjustment by reading multiple places on the adjustment chart separately by multiple times, the control section controls so as to produce display image data including the number of times of reading of the adjustment chart.

DETAILED DESCRIPTION OF THE PREFERRED EMBODIMENT

Hereafter, with reference to drawings, detailed description will be given to a mode (embodiment) for implementing an image forming apparatus, an image forming system, and an image formation control method in relation to the present invention.

Herein, description is given to processing procedures in the image formation control method with operation description for the image forming apparatus and the image forming system.

[Constitution of an Image Forming Apparatus]

Figure 1:
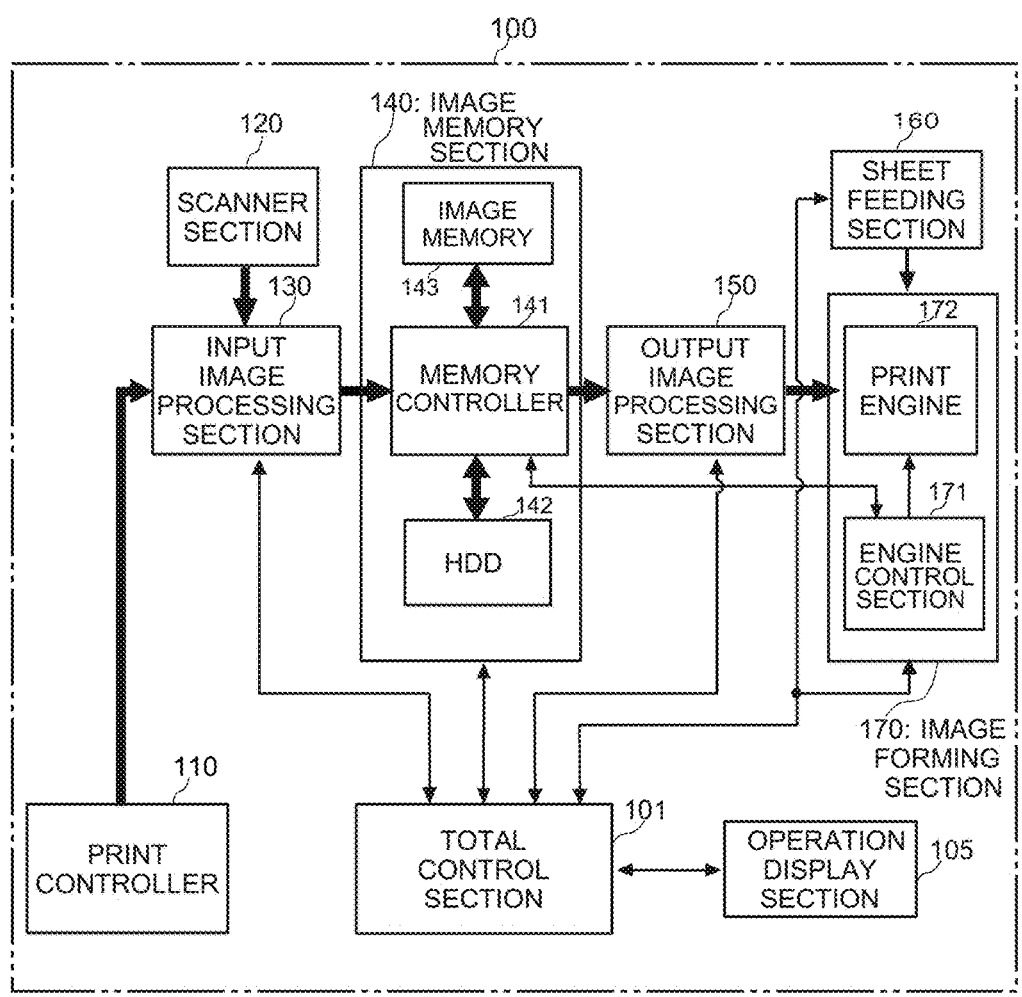
FIG. 1 is a constitution diagram showing an outline constitution of an image forming apparatus.

Now, detailed description is given to the constitution of an image forming apparatus 100 of an electrographic type based on FIG. 1. Incidentally, description is omitted to general matters which are well known as the image forming apparatus 100 and do not directly relate to characteristic operation and control in the present embodiment, such as general constitution in an electric power unit and a communication interface.

In FIG. 1, a print controller 110 and the image forming apparatus 100 are connected to each other. Each of the print controller 110 and the image forming apparatus 100 may be made to an apparatus which exist completely independently from the other, and the print controller 110 and the image forming apparatus 100 may be made in a state that such two independent apparatuses are connected to each other. Alternatively, each of the print controller 110 and the image forming apparatus 100 may not exist completely independently from others, and the print controller 110 and the image forming apparatus 100 may be in a state of being constituted to be connectable mechanically.

The print controller 110 shown in FIG. 1 is configured to receive print data constituted by code data and vector data described with PDL (Page Description Language) as a print job from an external computer and the like.

Further, the print controller 110 performs rasterize processing with RIP processing for the print job transmitted from the computer and develops it to image data in a bit map format.

The image forming apparatus 100 shown in FIG. 1 includes a total control section 101, an operation display section 105, the print controller 110, a scanner section 120, an input image processing section 130, an image memory section 140, an output image processing section 150, a sheet feeding section 160, and an image forming section 170.

In this embodiment, the total control section 101 is configured to perform control for the respective sections of the image forming apparatus 100 as general control in addition to characteristic control mentioned below.

The operation display section 105 is configured to receive various kinds of operation input by an operator and to perform various kinds of display. The scanner section 120 is configured to read documents and adjustment charts as an image reading section and to produce image data.

The scanner section 120 reads a document and produces document image data. Further, the scanner section 120 reads an adjustment chart and produces adjustment image data (image data for adjustment).

The input image processing section 130 is configured to perform input image processing for input image data. The image memory section 140 is configured to memorize image data and various data and to read out image data in synchronization with an image formation timing.

The output image processing section 150 is configured to perform output image processing for image data read out in the image memory section 140.

The sheet feeding section 160 is configured to feed recording sheets to the image forming section 170 in synchronization with an image formation timing. The image forming section 170 is configured to form an image on a recording sheet based on image data. Herein, the total control section 101 includes a CPU (Central Processing Unit), a ROM (Read Only Memory), and a RAM (Random Access memory) which are not shown in the drawings.

The CPU is configured to execute various programs memorized in the ROM on a work area in a predetermined region of the RAM and to control the respective sections of the image forming apparatus 100 totally.

The operation display section 105 includes input devices, such as a key board, a mouse, a touch panel, and the like, and is configured to transmit various kinds of input instructions as operation signals to the total control section 101. Further, the operation display section 105 includes display devices such as a LCD (Liquid Crystal Display) and a CRT (Cathode Ray Tube), and is configured to display various image data input from the total control section 101.

In the operation display section 105, an operating section and a displaying section may be separated from each other. Further, the operation display section 105 may be a touch panel to allow displayed icons or keys to be depressed.

The scanner section 120 may be integrated with the image forming apparatus 100 as a single body. However, the scanner section 120 may exist independently as another apparatus separated from the image forming apparatus 100. In the case where the scanner section 120 exists independently of the image forming apparatus 100, the image forming apparatus 100 and the scanner section 120 are connected to each other with a signal cable or via a network.

The input image processing section 130 is configured to perform various kinds of input image processing for input image data input from the print controller 10. Further, in the case where a not-shown scanner is connected to the input image processing section 130, the input image processing section 130 performs input image processing also for input image data acquired via the scanner as required.

The image memory section 140 includes a memory controller 141 which executes various kinds of control with regard to memorization, a HDD (Hard Disc Driver) 142 which stores image data input from the print controller 10 and memorizes them in a non-volatility mode, and an image memory 143 constituted by a DRAM (Dynamic Random Access Memory) which memorizes temporarily image data to output image formation in a state of being developed.

In the HDD 142, the image data of a background sheet for measurement (hereafter, referred to as a measurement background sheet) and the image data of an adjustment chart are stored beforehand. The output image processing section 150 is configured to perform output image processing necessary for image formation, such as printer gamma conversion, error dispersion processing, and minute variable magnification processing, for the image data memorized in the image memory section 140.

The sheet feeding section 160 is configured to store sheets with a standard size in a sheet feeding tray, to store long sheets such as roll sheets in a long sheet tray, and to feed a recording sheet to form an image to the image forming section 170 in synchronization with an image formation timing.

The image forming section 170 may be an image forming section of an electrophotographic type or other various types or a printing apparatus, and is configured to output an image formed on a recording sheet in a copying device, a printer or a facsimile device. The image forming section 170 includes an engine control section 171 to execute various kinds of control with regard to image formation and a print engine 172 to execute image formation based on image data transmitted from the output image processing section 150.

The print controller 110 and the scanner section 120 may be disposed outside distantly from the image forming apparatus 100. Further, also, the operation display section 105 may be disposed on a position separated from the image forming apparatus 100.

[Constitution of an Image Forming System]

Figure 2:
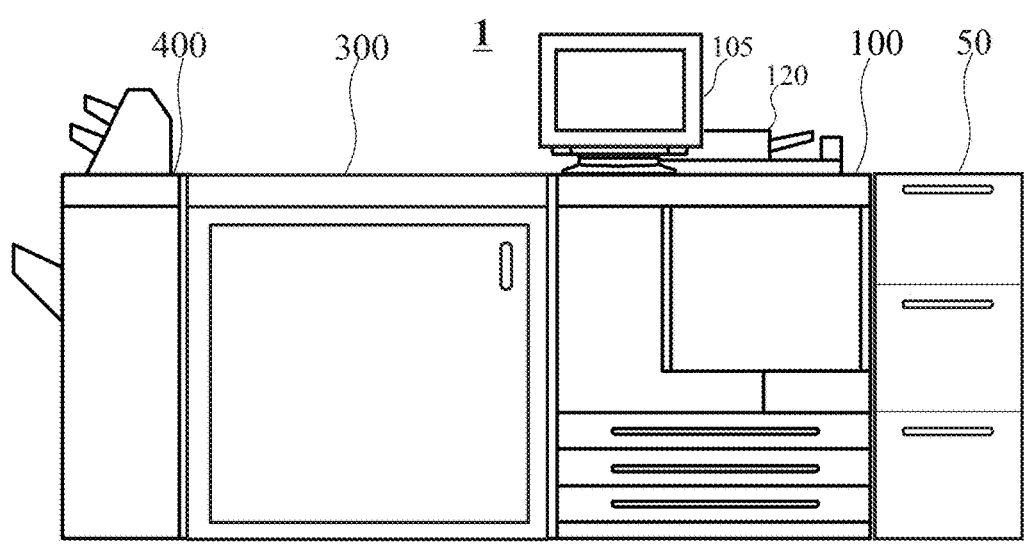
FIG. 2 is a constitution diagram showing an outline constitution of an image forming system.

FIG. 2 is a constitution illustration showing an outline constitution of an image forming system 1 including the image forming apparatus 100. Herein, the illustration shows a situation that a sheet feeding device 50, a post processing device 300, and a delivery device 400 are connected to the image forming apparatus 100.

This connection is one example, and it may be possible to constitute the image forming system 1 by arbitrarily increasing or decreasing the number of apparatuses to be connected to the image forming apparatus 100.

Further, it may be also possible to constitute the image forming system 1 as a whole by connecting an independent image reading device or an independent operation display device to the image forming apparatus 100 separately from the system constitution shown in FIG. 2.

[Description of a Chart]

Hereafter, description is given to an adjustment chart and a background chart for measurement as charts used at the time of executing various kinds of adjustment for the image forming apparatus 100.

[Description of an Adjustment Chart]

Figure 3:
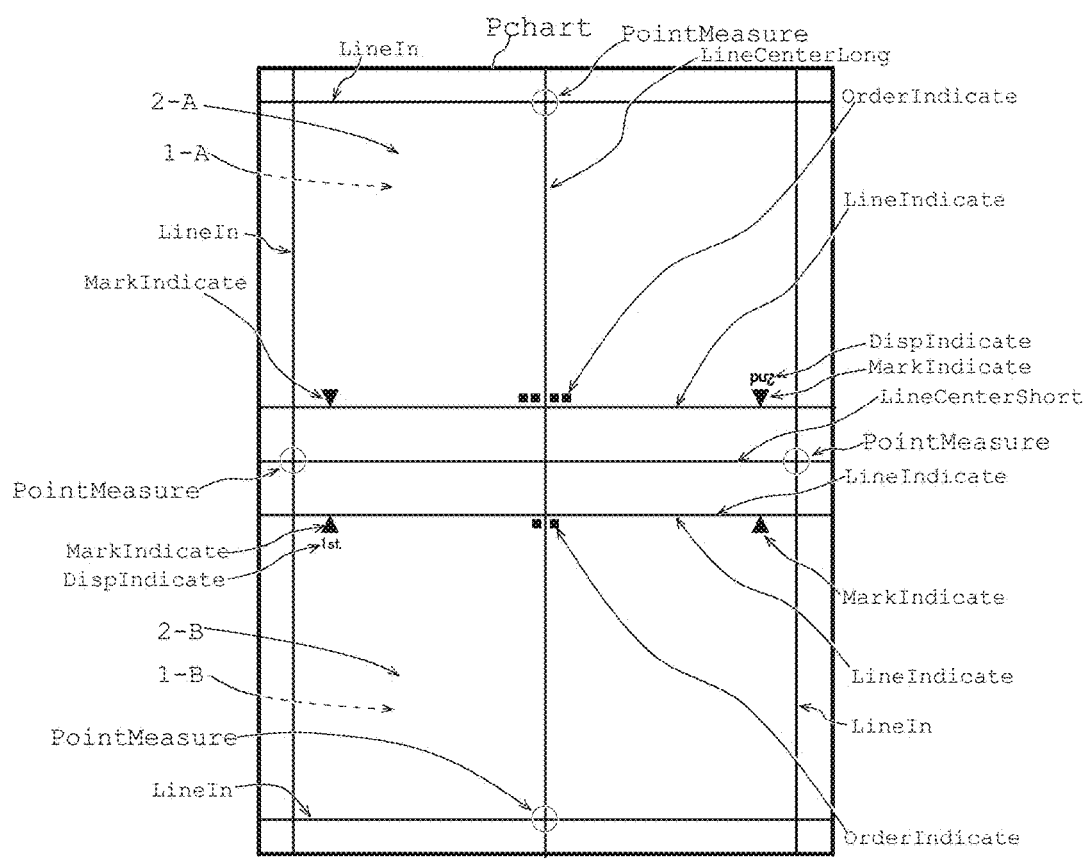
FIG. 3 is an explanatory drawing showing a situation of an adjustment chart.
Figure 4:
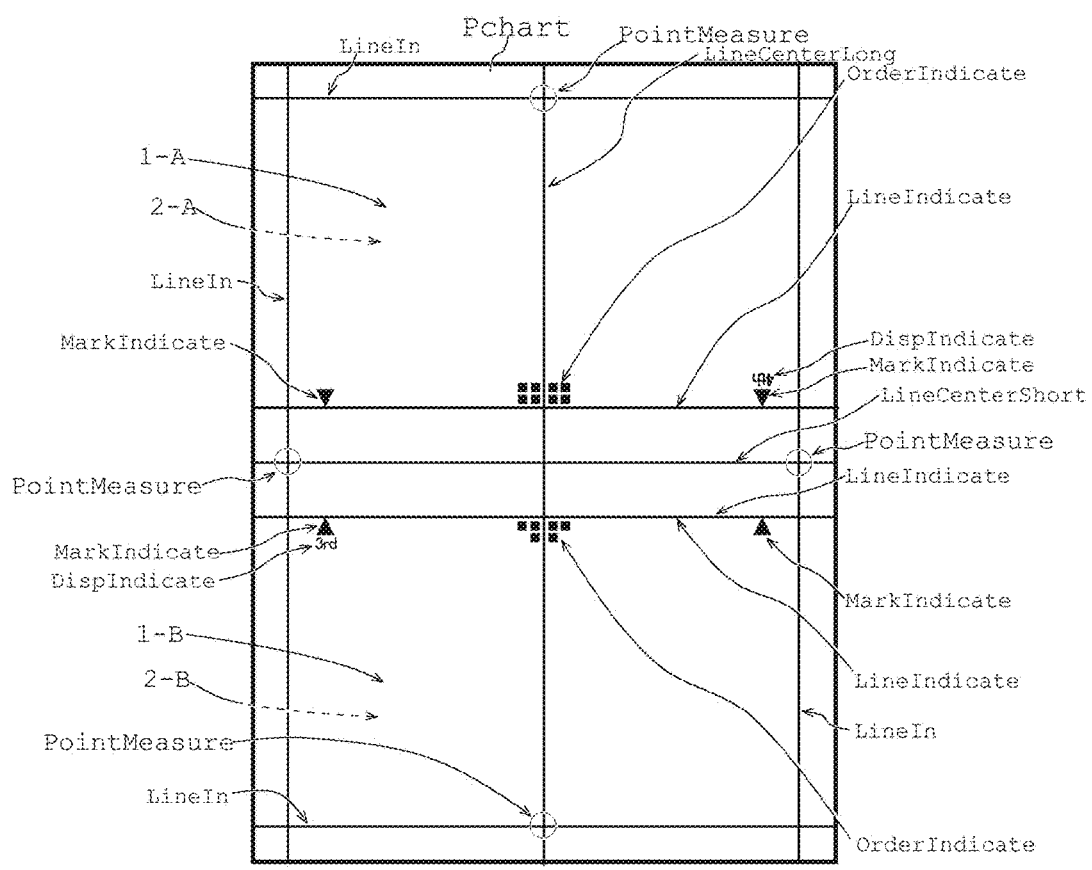
FIG. 4 is an explanatory drawing showing a situation of an adjustment chart.

Herein, as an adjustment chart, a chart used for positioning images formed on both sides at the time of forming images on both sides in the image forming apparatus 100 is made to a specific example. FIG. 3 and FIG. 4 each shows one example of the adjustment chart.

Herein, the size of a chart described below is determined so as to match with each of a maximum sheet size on which image formation can be performed in the image forming apparatus 100 and a maximum sheet size which is readable in the scanner section 120. For example, in the case where each of a maximum sheet size on which image formation can be performed in the image forming apparatus 100 and a maximum sheet size which is readable in the scanner section 120 is A4 size, a chart described below is made to A4 size. Further, in the case where each of a maximum sheet size on which image formation can be performed in the image forming apparatus 100 and a maximum sheet size which is readable in the scanner section 120 is a size of 11×17, a chart described below is made to a size of 11×17. Further, in the case where each of a maximum sheet size on which image formation can be performed in the image forming apparatus 100 and a maximum sheet size which is readable in the scanner section 120 is A4 size, a chart described below is made to A4 size.

Herein, four points positioned separately in the vicinity of the respective centers between respective end portions (respective sides) of an adjustment chart are determined as measurement points "PointMeasure" ("PointMeasure" surrounded by a circle in FIG. 3 and FIG. 4) as points to be measured.

Hereafter, detailed description is given to the adjustment chart. First, a line "LineIn" is drawn on a position located inside with a predetermined distance (for example, 1 cm etc.) from each of the end portions of the adjustment chart. Further, a center line "LineCenterLong" in the long side direction is drawn in the long side direction of the adjustment chart at a position of the center between both long sides. Furthermore, a center line "LineCenterShort" in the short side direction is drawn in the short side direction of the adjustment chart at a position of the center between both short sides.

In the case of drawing in the above way, four points in total of two points at intersection points between each of the two lines "LineIn" and the center line "LineCenterLong" in the long side direction and two points at intersection points between each of the two lines "LineIn" and the center line "LineCenterShort" in the short side direction are determined as measurement points "PointMeasure" ("PointMeasure" in FIG. 3 and FIG. 4).

The circles each of which surrounds one of the measurement points "PointMeasure" in FIG. 3 and FIG. 4 are shown for the purpose of description and are not needed as the adjustment chart. The measurement points "PointMeasure" prepared by drawing in the above ways are disposed based on the end portions of a sheet. Accordingly, in the case where various kinds of errors do not exist, the measurement points are expected to be formed at the respective same positions on both sides of a sheet.

Here, as shown in FIG. 3 and FIG. 4, in the case where an adjustment chart is placed in a portrait orientation (with a short side placed at the top), a region above the center line "LineCenterShort" in the short side direction is called "A region" for convenience. Similarly, as shown in FIG. 3 and FIG. 4, in the case where an adjustment chart is placed in a portrait orientation, a region below the center line "LineCenterShort" in the short side direction is called "B region" for convenience. Further, in a state shown in FIG. 3, the back surface is made to the first surface, and the front surface is made into the second surface. Namely, in a state shown in FIG. 4, the front surface is made to the first surface, and the back surface is made into the second surface.

With this, the A region on the back surface in FIG. 3 and the A region on the front surface in FIG. 4 are made to the A region on the first surface and called "a 1-A region". Further, the B region on the back surface in FIG. 3 and the B region on the front surface in FIG. 4 are made to the B region on the first surface and called "a 1-B region". Further, the A region on the front surface in FIG. 3 and the A region on the back surface in FIG. 4 are made to the A region on the second surface and called "a 2-A region". Further, the B region on the front surface in FIG. 3 and the B region on the back surface in FIG. 4 are made to the B region on the second surface and called "a 2-B region".

Figure 5:
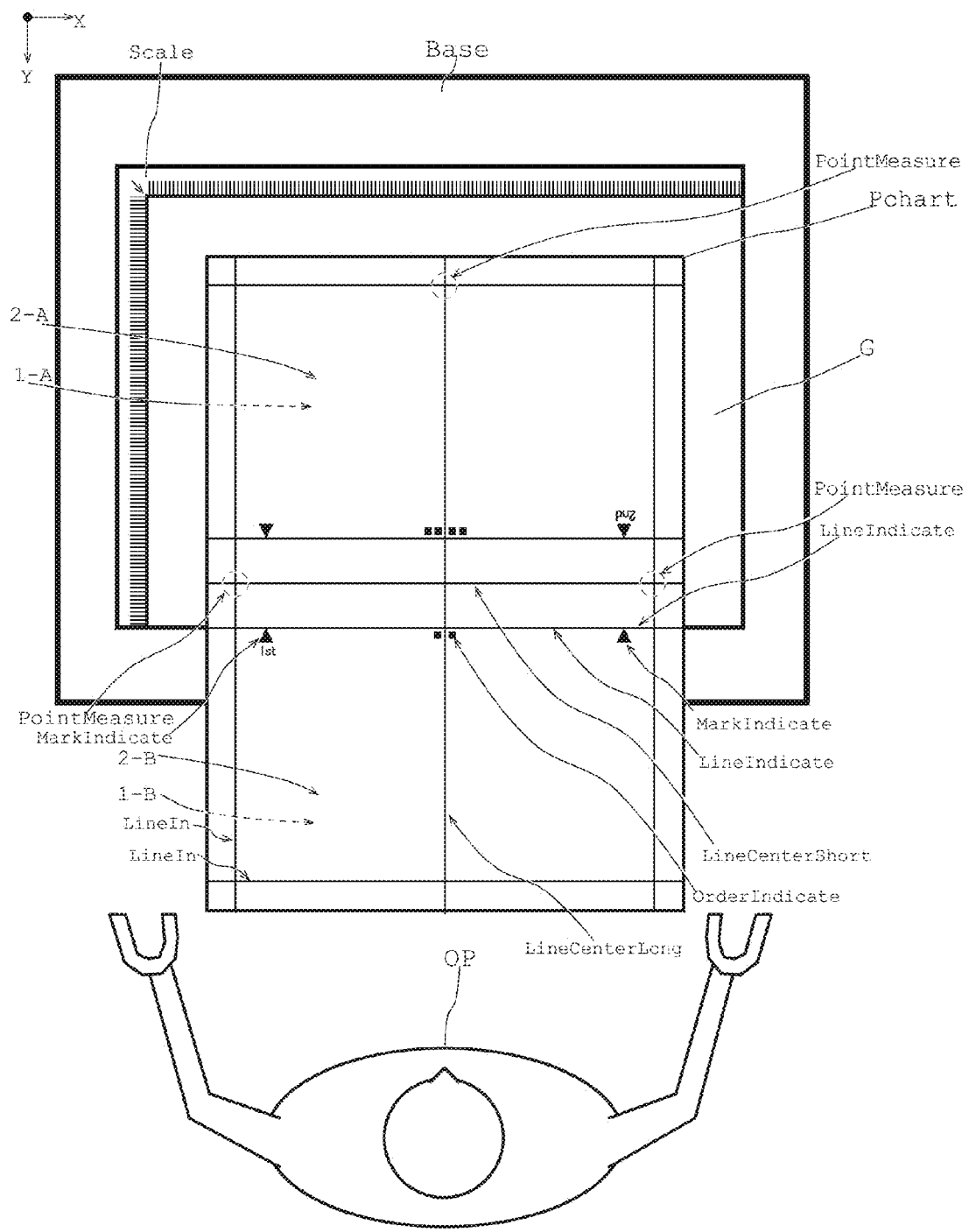
FIG. 5 is an explanatory drawing showing a situation of an adjustment chart.

FIG. 5 shows a situation when the measurement point "PointMeasure" on the 1-A region of the adjustment chart shown in FIG. 3 is read by the scanner section 120. As shown in FIG. 5, the 2-B region which is the opposite surface and the opposite region to the read region of the adjustment chart is made in a state of being easily caught by the eyes of an operator OP.

FIG. 5 is an explanatory drawing showing schematically a document placing section of the scanner section 120 together with the adjustment chart. In FIG. 5, G is a platen glass constituted by a transparent glass, and a line sensor and the like are disposed at the inner portion of the sheet surface of the platen glass G. Further, on the periphery of the platen glass G, a scale Scale configured to show a document size and a document placing position is disposed. The platen glass G and the scale Scale are held by a base Base which is a casing of the scanner section 120. Further, the lower side in FIG. 5 corresponds to a position near to a position where an operator OP stands.

Herein, in the case where it is assumed that the lateral direction of the operator OP who faces toward the image forming apparatus 100 in the Y direction is made to the X direction, the long side direction of the platen glass G is made to the X direction. Further, a direction orthogonal to the X direction is made to the Y direction. On the platen glass G with the long side direction oriented to the X direction, at least the half region of the adjustment chart with the long side direction oriented to the Y direction is read sequentially. Each of the X direction and the Y direction is a directions defined for convenience of description.

Then, in FIG. 3, so as to make it possible to read the 1-A region of the adjustment chart correctly, an auxiliary line "LineIndicate" is drawn as a mark in parallel to the center line "LineCenterShort" in the short side direction distantly from the center line "LineCenterShort" in the short side direction by a predetermined distance toward the 2-B region side. The operator refers to this auxiliary line "LineIndicate", whereby it becomes possible to place the 1-A region of the adjustment chart on the scanner section 120 so as to read it without inclination. Details will be described later.

Further, so as to make it clear to read the 1-A region of the adjustment chart, chart read position indication marks "MarkIndicate" are drawn in the 2-B region at the respective positions which locate distantly from the center line in the short side direction rather than the auxiliary line "LineIndicate" and along the auxiliary line "LineIndicate". As a specific example, in the 2-B region in FIG. 3, each of the chart read position indication marks is indicated with a triangular painted-mark as "MarkIndicate".

Further, so as to make the reading order of the 1-A region of the adjustment chart clear, a chart reading order indication "DispIndicate" is drawn in the 2-B region at a position which locates in the vicinity of one of the chart read position indication marks "MarkIndicate" and further distantly from the center line in the short side direction. In FIG. 3, the indication "1st" is drawn in the vicinity of one of the chart read position indication marks "MarkIndicate" of the triangular painted-mark in the 2-B region.

The indication "1st" in the chart reading order indication "DispIndicate" indicates that the reading order of the 1-A region of the adjustment chart is the first. Similarly, so as to make the reading order of the 1-A region of the adjustment chart clear, a chart reading order indication "OrderIndicate" is drawn in the 2-B region at a position which locates distantly from the center line in the short side direction rather than the auxiliary line "LineIndicate" and is put between the auxiliary line "LineIndicate" and the center line in the long side direction.

In the example of the 2-B region in FIG. 3, as the chart reading order indication "OrderIndicate", a quadrangular painted-mark in which one piece is made in one group is drawn at two places. As the chart reading order indication "OrderIndicate", "one piece" of the quadrangular painted-mark indicates that the reading order of the 1-A region of the adjustment chart is the first, similarly to the indication "1st" in the above-mentioned chart reading order indication "DispIndicate".

In FIG. 3, similarly to the above description, when the measurement point "PointMeasure" on the 1-B region of the adjustment chart is read by the scanner section 120, the 2-A region which is the opposite surface and the opposite region of the adjustment chart is made in a state of being easily caught by the eyes of an operator OP.

Then, so as to make it possible to read the 1-B region of the adjustment chart correctly, an auxiliary line "LineIndicate" is drawn as a mark in parallel to the center line "LineCenterShort" in the short side direction distantly from the center line "LineCenterShort" in the short side direction by a predetermined distance toward the 2-A region side. The operator refers to this auxiliary line "LineIndicate", whereby it becomes possible to place the 1-B region of the adjustment chart on the scanner section 120 so as to read it without inclination. Details will be described later.

Further, so as to make it clear to read the 1-B region of the adjustment chart, chart read position indication marks "MarkIndicate" are drawn in the 2-A region at the respective positions which locate distantly from the center line in the short side direction rather than the auxiliary line "LineIndicate" and along the auxiliary line "LineIndicate". As a specific example, in the 2-A region in FIG. 3, each of the chart read position indication marks is indicated with a triangular painted-mark.

Further, so as to make the reading order of the 1-B region of the adjustment chart clear, a chart reading order indication "DispIndicate" is drawn in the 2-A region at a position which locates in the vicinity of one of the chart read position indication marks "MarkIndicate" and further distantly from the center line in the short side direction. In FIG. 3, the indication "2nd" is drawn in the vicinity of one of the chart read position indication marks "MarkIndicate" of the triangular painted-mark in the 2-A region. The indication "2nd" in the chart reading order indication "DispIndicate" indicates that the reading order of the 1-B region of the adjustment chart is the second.

Similarly, so as to make the reading order of the 1-B region of the adjustment chart clear, a chart reading order indication "OrderIndicate" is drawn in the 2-A region at a position which locates distantly from the center line in the short side direction rather than the auxiliary line "LineIndicate" and is put between the auxiliary line "LineIndicate" and the center line in the long side direction. In the example of the 2-A region in FIG. 3, as the chart reading order indication "OrderIndicate", a quadrangular painted-mark in which two pieces are made in one group is drawn at two places. As the chart reading order indication "OrderIndicate", "two pieces" of the quadrangular painted-mark indicates that the reading order of the 1-B region of the adjustment chart is the second, similarly to the indication "2nd" in the chart reading order indication "DispIndicate".

In FIG. 4, when the measurement point "PointMeasure" on the 2-A region of the adjustment chart is read by the scanner section 120, the 1-B region which is the opposite surface and the opposite region of the adjustment chart is made in a state of being easily caught by the eyes of an operator OP.

Then, so as to make it possible to read the 2-A region of the adjustment chart correctly, an auxiliary line "LineIndicate" is drawn as a mark in parallel to the center line "LineCenterShort" in the short side direction distantly from the center line "LineCenterShort" in the short side direction by a predetermined distance toward the 1-B region side. The operator refers to this auxiliary line "LineIndicate", whereby it becomes possible to place the 2-A region of the adjustment chart on the scanner section 120 so as to read it without inclination. Details will be described later.

Further, so as to make it clear to read the 2-A region of the adjustment chart, chart read position indication marks "MarkIndicate" are drawn in the 1-B region at the respective positions which locate distantly from the center line in the short side direction rather than the auxiliary line "LineIndicate" and along the auxiliary line "LineIndicate". As a specific example, in the 1-B region in FIG. 4, each of the chart read position indication marks is indicated with a triangular painted-mark.

Further, so as to make the reading order of the 2-A region of the adjustment chart clear, a chart reading order indication "DispIndicate" is drawn in the 1-B region at a position which locates in the vicinity of one of the chart read position indication marks "MarkIndicate" and further distantly from the center line in the short side direction. In FIG. 4, the indication "3rd" is drawn in the vicinity of one of the chart read position indication marks "MarkIndicate" of the triangular painted-mark in the 1-B region. The indication "3rd" in the chart reading order indication "DispIndicate" indicates that the reading order of the 2-A region of the adjustment chart is the third.

Similarly, so as to make the reading order of the 2-A region of the adjustment chart clear, a chart reading order indication "OrderIndicate" is drawn in the 1-B region at a position which locates distantly from the center line in the short side direction rather than the auxiliary line "LineIndicate" and is put between the auxiliary line "LineIndicate" and the center line in the long side direction. In the example of the 1-B region in FIG. 4, as the chart reading order indication "OrderIndicate", a quadrangular painted-mark in which three pieces are made in one group is drawn at two places. As the chart reading order indication "OrderIndicate", "three pieces" of the quadrangular painted-mark indicates that the reading order of the 2-A region of the adjustment chart is the third, similarly to the indication "3rd" in the chart reading order indication "DispIndicate".

In FIG. 4, similarly to the above description, when the measurement point "PointMeasure" on the 2-B region of the adjustment chart is read by the scanner section 120, the 1-A region which is the opposite surface and the opposite region of the adjustment chart is made in a state of being easily caught by the eyes of an operator OP.

Then, so as to make it possible to read the 2-B region of the adjustment chart correctly, an auxiliary line "LineIndicate" is drawn as a mark in parallel to the center line "LineCenterShort" in the short side direction distantly from the center line "LineCenterShort" in the short side direction by a predetermined distance toward the 1-A region side. The operator refers to this auxiliary lie "LineIndicate", whereby it becomes possible to place the 2-B region of the adjustment chart on the scanner section 120 so as to read it without inclination. Details will be described later.

Further, so as to make it clear to read the 2-B region of the adjustment chart, chart read position indication marks "MarkIndicate" are drawn in the 1-A region at the respective positions which locate distantly from the center line in the short side direction rather than the auxiliary line "LineIndicate" and along the auxiliary line "LineIndicate". As a specific example, in the 1-A region in FIG. 4, each of the chart read position indication marks is indicated with a triangular painted-mark.

Further, so as to make the reading order of the 2-B region of the adjustment chart clear, a chart reading order indication "DispIndicate" is drawn in the 1-A region at a position which locates in the vicinity of one of the chart read position indication marks "MarkIndicate" and further distantly from the center line in the short side direction. In FIG. 4, the indication "4th" is drawn in the vicinity of one of the chart read position indication marks "MarkIndicate" of the triangular painted-mark in the 1-A region. The indication "4th" in the chart reading order indication "DispIndicate" indicates that the reading order of the 2-B region of the adjustment chart is the fourth.

Similarly, so as to make the reading order of the 2-B region of the adjustment chart clear, a chart reading order indication "OrderIndicate" is drawn in the 1-A region at a position which locates distantly from the center line in the short side direction rather than the auxiliary line "LineIndicate" and is put between the auxiliary line "LineIndicate" and the center line in the long side direction.

In the example in FIG. 4, as the chart reading order indication "OrderIndicate", a quadrangular painted-mark in which four pieces are made in one group is drawn at two places. As the chart reading order indication "OrderIndicate", "four pieces" of the quadrangular painted-mark indicates that the reading order of the 2-B region of the adjustment chart is the fourth, similarly to the indication "4th" in the chart reading order indication "DispIndicate".

[Description of Placement of an Adjustment Chart]

Figure 6:
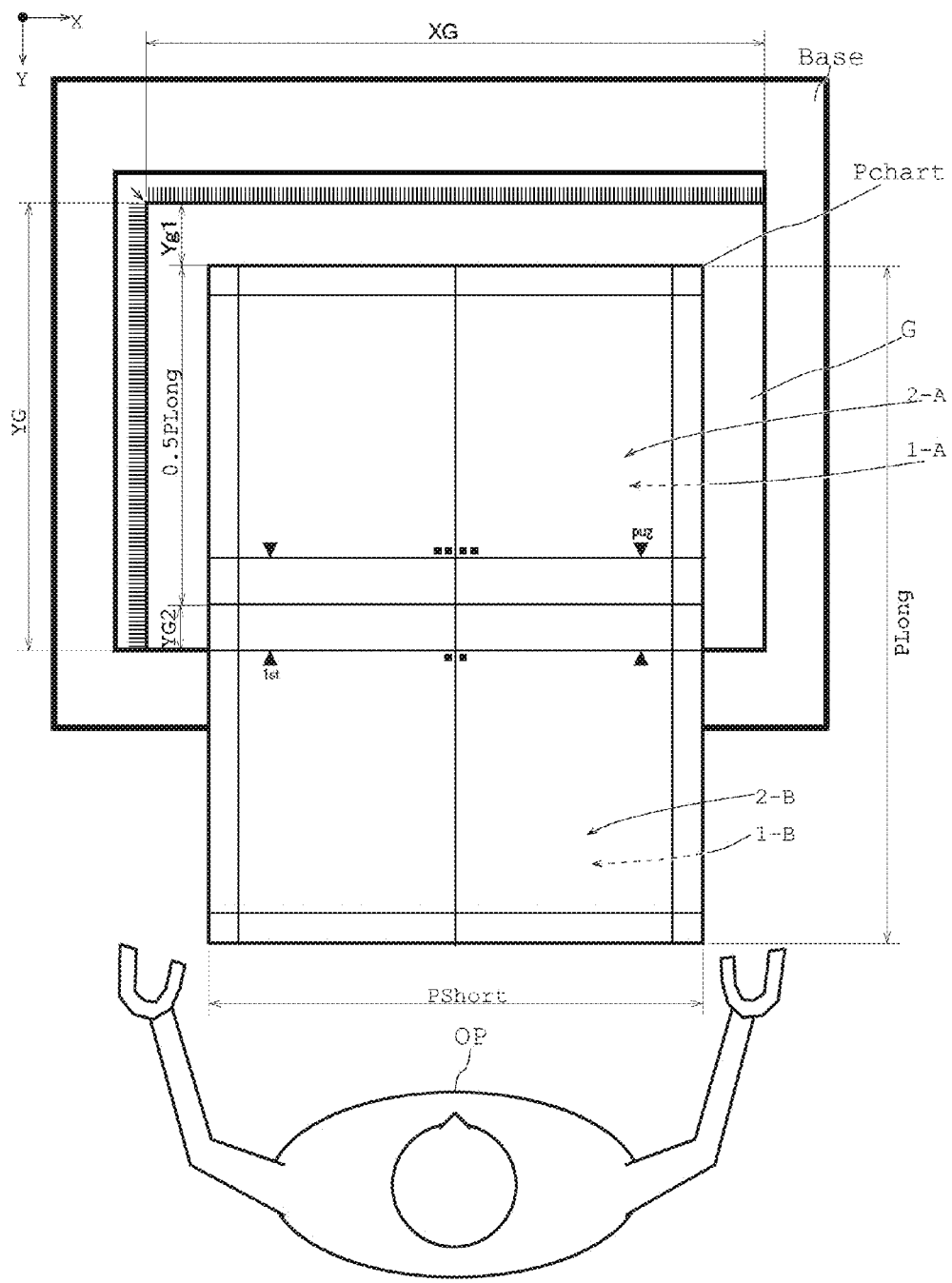
FIG. 6 is an explanatory drawing showing a situation of an adjustment chart.

In a state where the 1-A region of the adjustment chart is placed on the platen glass G of the scanner section 120 so as to be read as shown in FIG. 5, examples of dimension of each portion is shown in FIG. 6. In FIG. 6, similarly to FIG. 5, the X direction and the Y direction are defined for convenience.

Herein, a length XG in the long side direction (in the X direction in FIG. 6) and a length YG in the short side direction (in the Y direction in FIG. 6) in the platen glass G are determined so as to cover a sheet of A3 size (297×420 mm) and a sheet of 11×17 size (279.4×431.8 mm). For example, XG is set to 431.8 mm, and YG is set to 297 mm.

Further, in the case where an adjustment chart is a sheet of 11×17 size, PShort is set to 279.4 mm, and PLong is set to 431.8 mm. Further, in the case where the long side direction of the platen glass G of the scanner section 120 is made to the X direction, as shown in FIG. 5 and FIG. 6, the long side direction of the adjustment chart is arranged in the Y direction.

With this, the scanner section 120 is made to read every half regions of each of both sides of the adjustment chart, i.e., in the order of the 1-A region, the 1-B region, the 2-A region, and the 2-B region. As a result, since the measurement point Measure of each of the four regions can be read at the same position on the scanner section 120 side, it is possible to make it hard to receive the influence of reading errors.

Herein, so as to make it possible to read the 1-A region of the adjustment chart correctly, an auxiliary line "LineIndicate" is drawn as a mark in parallel to the center line "LineCenterShort" in the short side direction distantly from the center line "LineCenterShort" in the short side direction by a predetermined distance Yg2 toward the 2-B region side. In the case where the adjustment chart is a sheet of 11×17 size, this predetermined distance Yg2 is set to about 22 mm to 42 mm. With this, the auxiliary line "LineIndicate" is aligned with the end portion of and the platen glass G, whereby it becomes possible to place the adjustment chart without inclination.

[Description of a Measurement Background Sheet (a Background Sheet for Measurement)]

In the adjustment chart mentioned above, with regard to the measurement point Measure, it is necessary to make a sheet end portion as the standard of measurement.

Then, it is required to place the adjustment chart on the platen glass G, and further, on the adjustment chart, it is required to place a measurement background sheet coated with a solid black so as to face the platen glass G side. Since it is necessary to cover the end portions of the adjustment chart by the solid black, the measurement background sheet is placed such that its long side direction is made to the same orientation with the platen glass G and the solid black is made to face the platen glass G.

Figure 7:
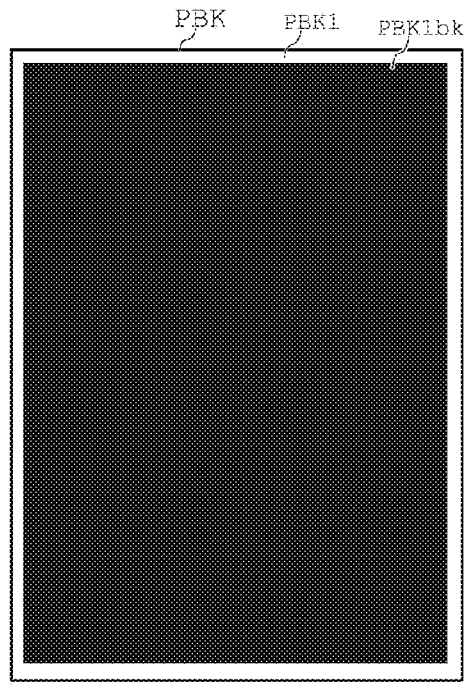
FIG. 7 is an explanatory drawing showing a situation of a measurement background sheet.

FIG. 7 shows a solid black region PBK1bk on a solid black surface PBK1 (read surface) of a measurement background sheet PBK. Here, it is permissible to cover the end portions of the adjustment chart shown in FIG. 5 and FIG. 6. For this reason, the solid black region PBK1bk of the measurement background sheet PBK may leave the sheet end portions.

Figure 8:
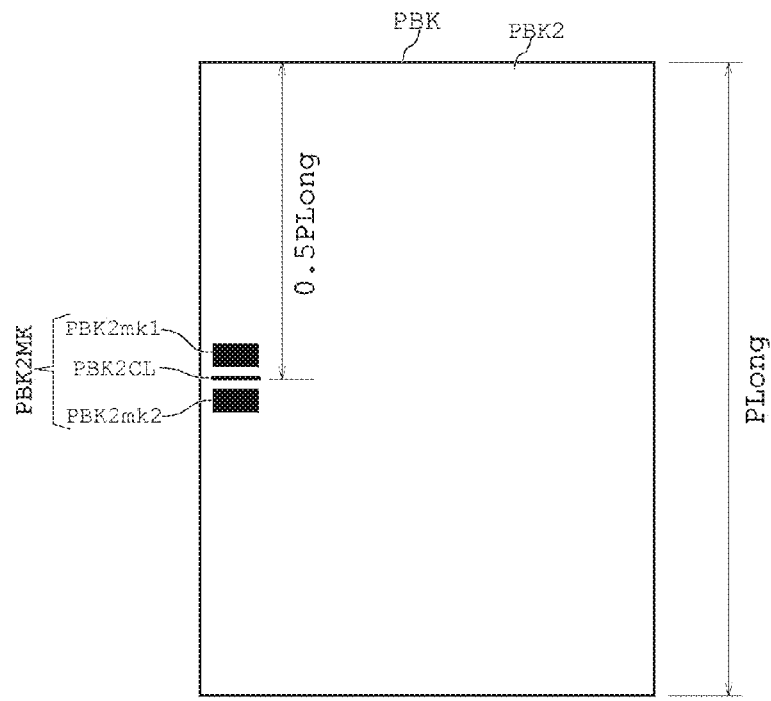
FIG. 8 is an explanatory drawing showing a situation of a measurement background sheet.

FIG. 8 shows a center position mark "PBK2MK" on the long side direction which shows a center position on the long side direction on a person-side surface PBK2 of the measurement background sheet PBK. In the center position mark "PBK2MK" on the long side direction, a center line "PBK2CL" is disposed at a position which locates at a middle point (½) of a length PLong in the long side direction and at an end portion in the short side direction. Further, a sign block mark "PBK2mk1" and a sign block mark "PBK2mk2" are disposed separately in the long side direction at both sides of the center line "PBK2CL" so as to neighbor on each other.

Figure 9:
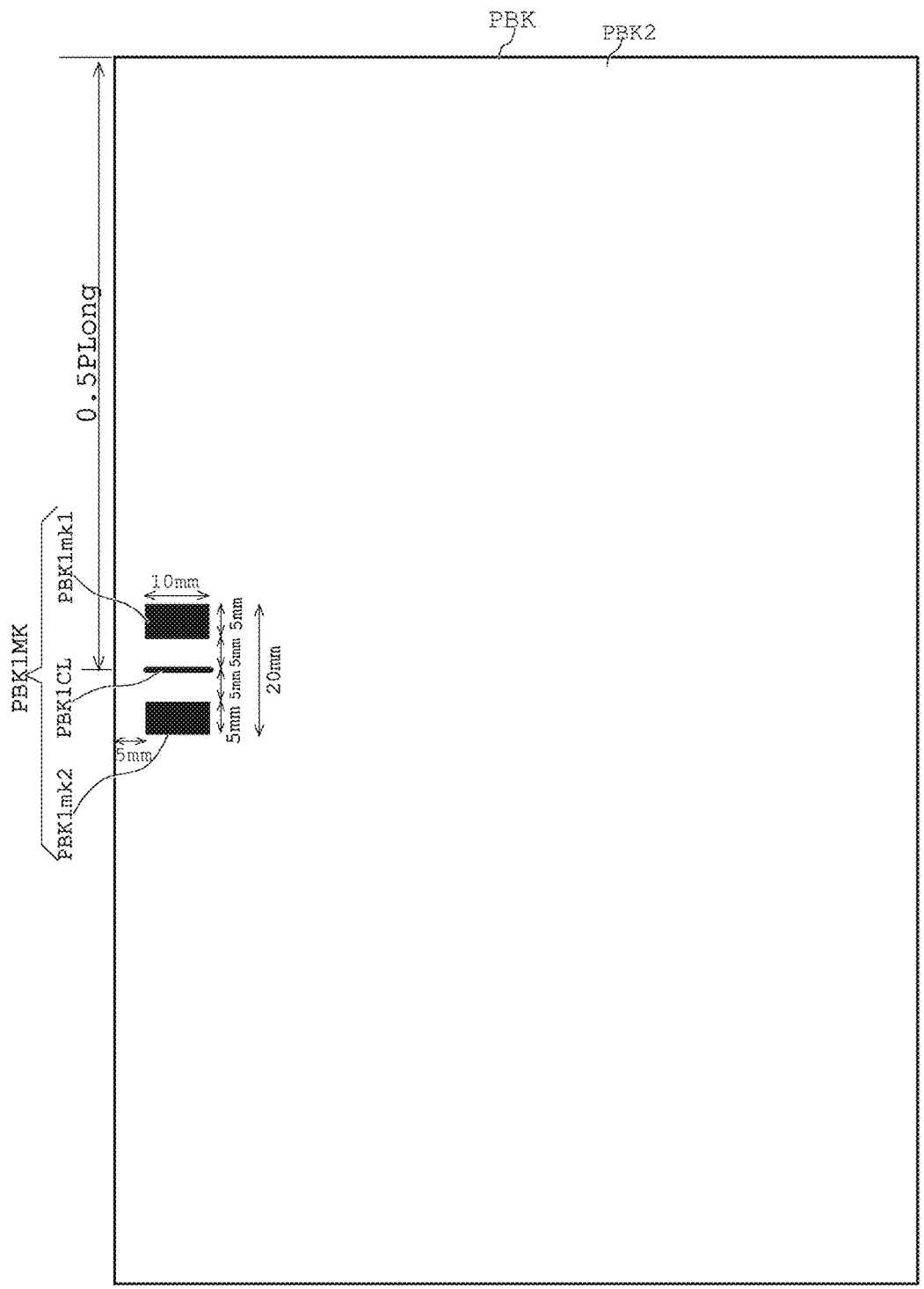
FIG. 9 is an explanatory drawing showing a situation of a measurement background sheet.

A specific example of the center position mark "PBK2MK" on the long side direction shown in FIG. 8 may be made as shown in FIG. 9. As the center position mark "PBK2MK" on the long side direction, a line with a length of 10 mm is drawn at a position separated by a distance of 5 mm from the end of a sheet. A sign block mark "PBK2mk1" and a sign block mark "PBK2mk2" each having a size of 5 mm×10 mm are disposed separately in the long side direction at both sides of the center line "PBK2CL" with a distance of 5 mm from the center line "PBK2CL" so as to neighbor on each other.

[Description of Placement of the Adjustment Chart and the Measurement Background Sheet]

Figure 10:
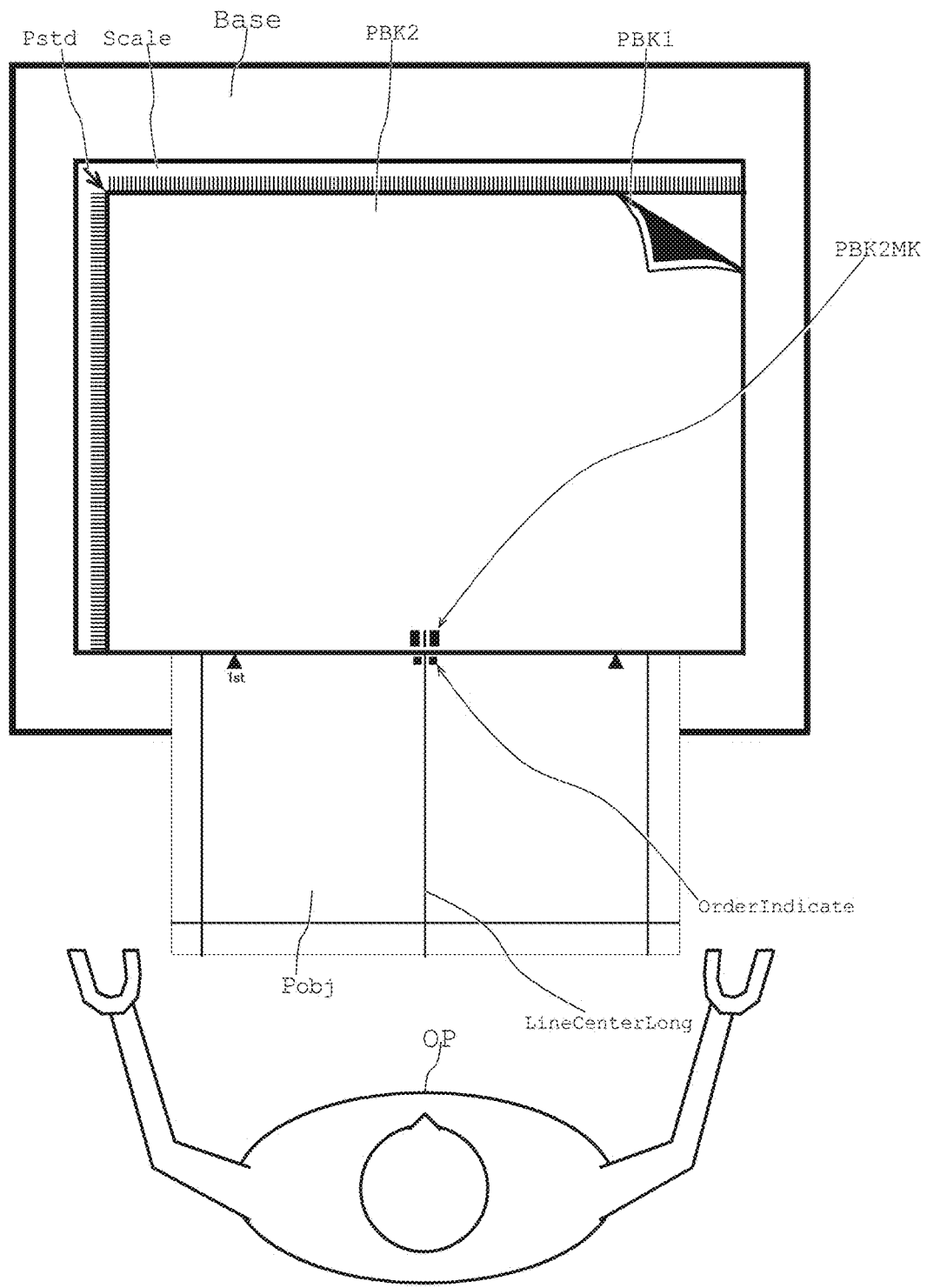
FIG. 10 is an explanatory drawing showing a placed state of an adjustment chart and a measurement background sheet.

FIG. 10 is an explanatory drawing showing a situation where the adjustment chart and the measurement background sheet are placed. First, the adjustment chart is placed on the platen glass G, as shown in FIG. 5 and FIG. 6. The lower side of FIG. 10 corresponds to a position where an operator OP stands.

Then, as shown in FIG. 10, the measurement background sheet in which the solid black surface PBK1 is made to face the adjustment chart is placed on the platen glass G. At this time, an end of the measurement background sheet is made to coincide with a standard position Pstd (refer to FIG. 10) disposed on the end portion of the platen glass G. Further, the center position mark "PBK2MK" on the long side direction of the measurement background sheet is made to face a region of the adjustment chart which protrudes from the platen glass G.

In this state, the center line "PBK2CL" included in the center position mark "PBK2MK" on the long side direction on the measurement background sheet is made to coincide with the center line "LineCenterLong" in the long side direction on the adjustment chart. With the operation in this way, the position of the adjustment chart on the platen glass G is fixed. In addition, the measurement point Measure of each of the 1-A, 1-B, 2-A, and 2-B regions of the adjustment chart is read at the same position at each time. As a result, it becomes possible to measure securely a position deviation due to both-side image formation.

The above description of the adjustment chart and the measurement background sheet is one specific example, and the present invention should not be limited to the specific example shown in here.

[Operation (1)]

Hereinafter, description is given to operation in the image forming apparatus 100 and the image forming system 1 with reference to a flow chart shown in FIG. 11. This description of operation is also applicable to a processing procedure in an image formation control method.

On a basic operation screen displayed on the operation display section 105, an operator clicks a front-back adjustment tab 105G1a. With this click, the whole control section 101 starts front-back adjustment processing in the present embodiment (Start in FIG. 11).

Figure 12:
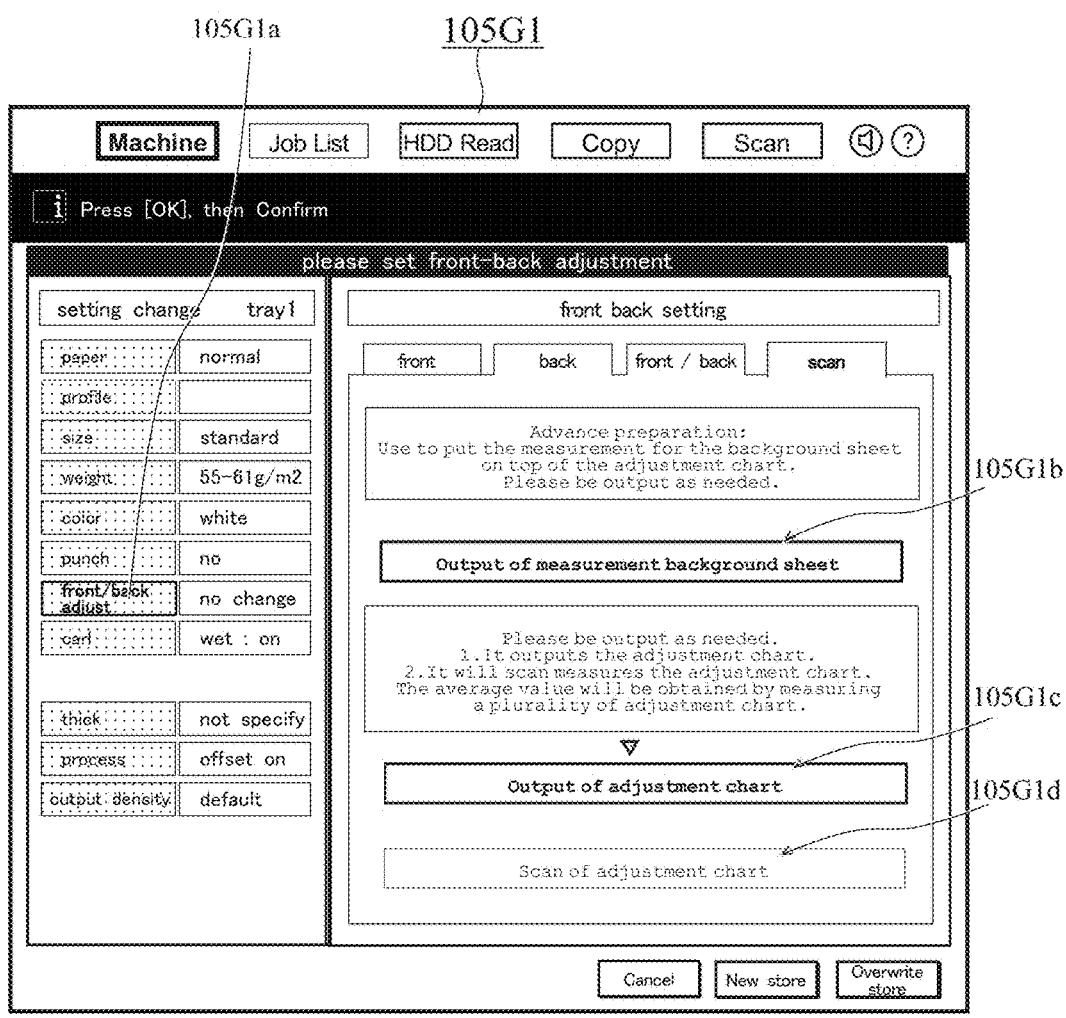
FIG. 12 is an explanatory drawing showing a situation of a display screen.

The whole control section 101 displays a front-back adjustment basic display screen 105G1 (FIG. 12) on the operation display section 105. On this front-back adjustment basic display screen 105G1, as a tab to select works in the front-back adjustment by scan measurement, a tab (105G1b in FIG. 12) of measurement background sheet output, a tab (105G1c in FIG. 12) of adjustment chart output, and a tab (105G1d in FIG. 12) of adjustment chart scan are displayed.

At a time when the output of each of the measurement background sheet output and the adjustment chart output has not been completed, the tab of measurement background sheet output and the tab of adjustment chart output are displayed in an active state capable of being clicked, and the tab of adjustment chart scan is displayed in an inactive state incapable of being clicked.

Figure 11:
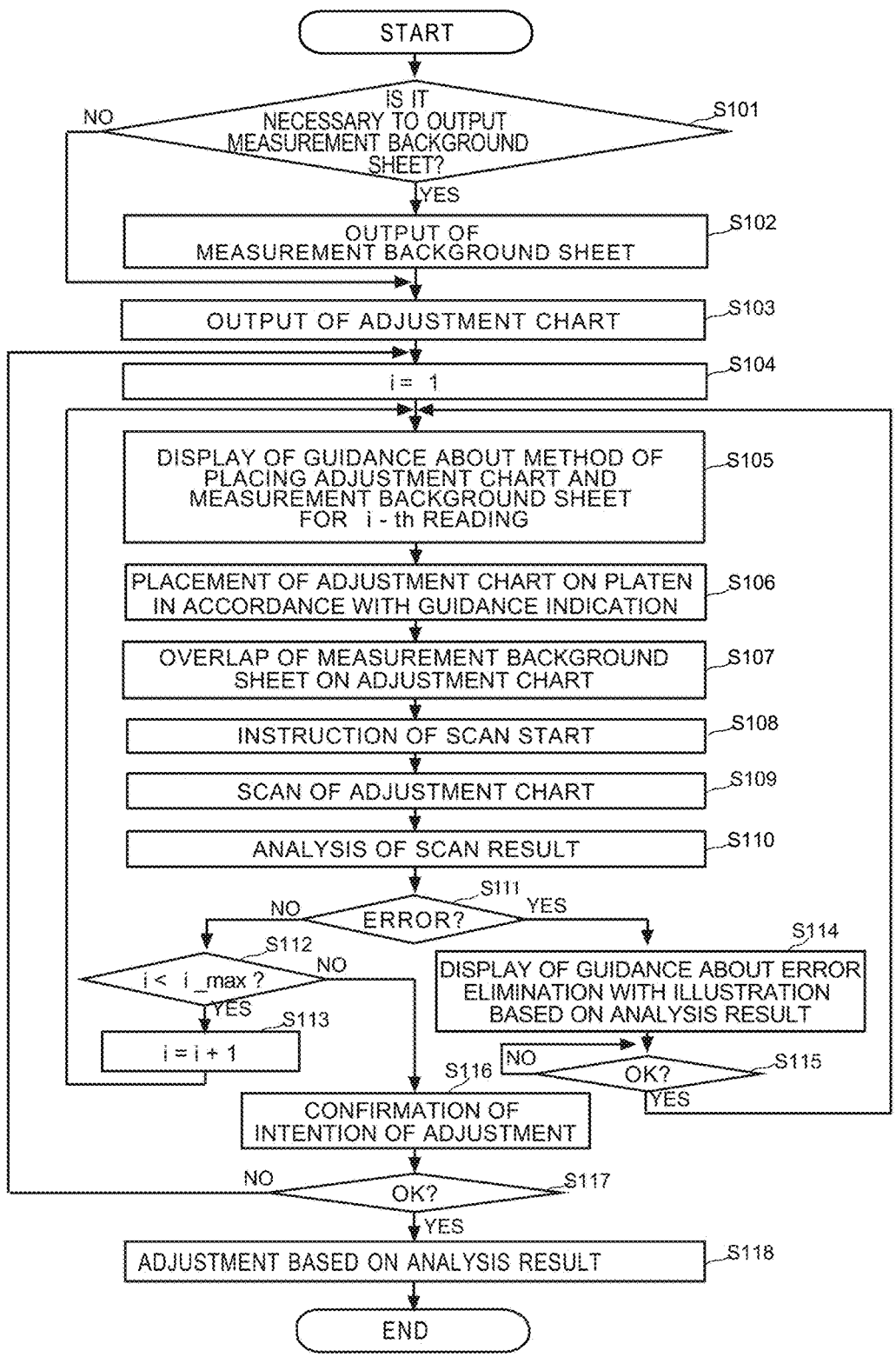
FIG. 11 is a flow chart showing operation in an embodiment.

As mentioned above, since the measurement background sheet having a solid black surface is a recyclable sheet, the operator clicks the tab 105G1b of measurement background sheet output as required, and outputs a measurement background sheet (Steps S101 and S102 in FIG. 11). When the tab 105G1b of measurement background sheet output is clicked, necessary image data are read out from the HDD 142 by the control of the whole control section 101, and the measurement background sheet described in FIG. 7 to FIG. 9 is formed in an image mode and output from the image forming section 170.

Successively, the operator clicks the tab 105G1c of adjustment chart output, and outputs an adjustment chart (Step S103 in FIG. 11). When the tab 105G1c of adjustment chart output is clicked, necessary image data are read out from the HDD 142 by the control of the whole control section 101, and the adjustment chart described in FIG. 3 to FIG. 6 is formed in an image mode and output from the image forming section 170.

Figure 13:
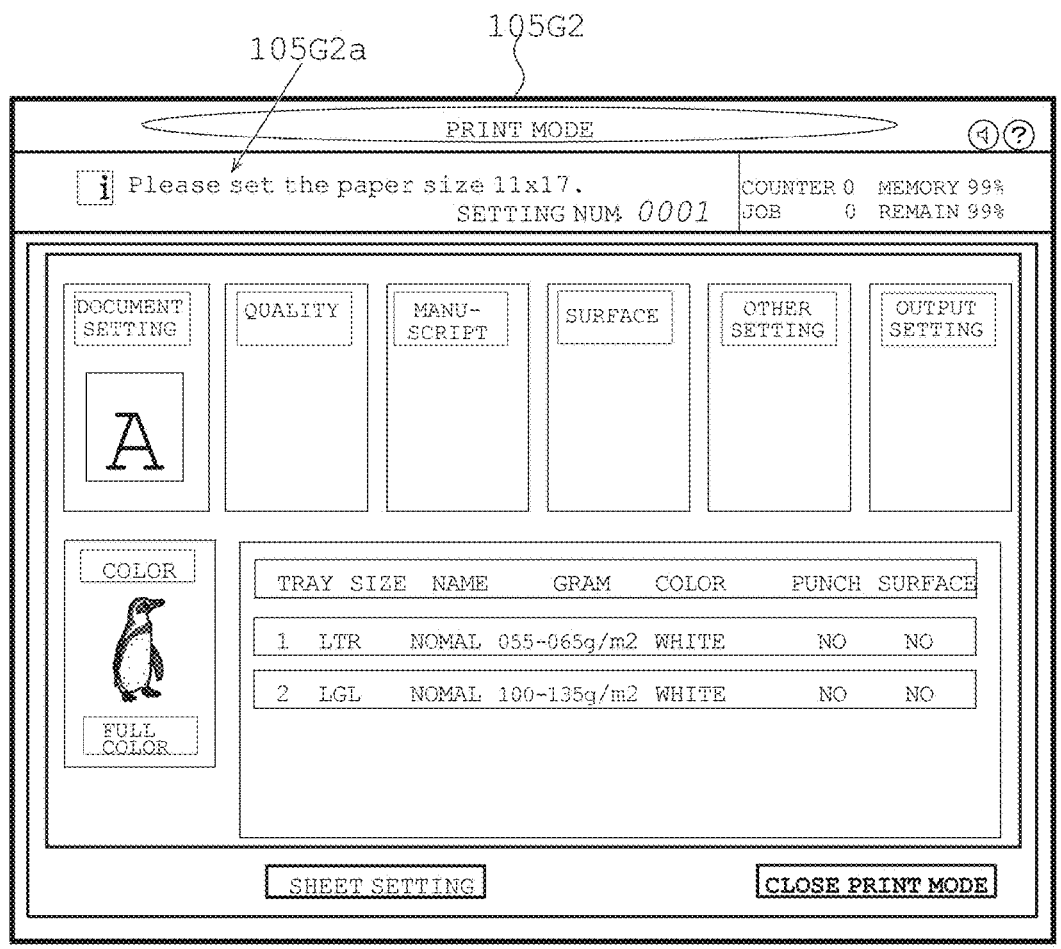
FIG. 13 is an explanatory drawing showing a situation of a display screen.

In the case where a sheet with a proper size does not exists at the time of outputting the measurement background sheet and the adjustment chart, the whole control section 101 displays a message of sheet supply on a display screen 105G2 as shown in FIG. 13. Herein, FIG. 13 shows a situation where a message 10502a "Please set a sheet of A3 or a sheet of 11×17 size" is displayed.

The proper size means a maximum size to enable scan and image formation in the image forming apparatus 100.

When the output of the adjustment chart has been completed, the whole control section 101 set the initial value, of a variable i with regard to the number of times of reading of the adjustment chart to 1 (Step S104 in FIG. 11). Further, in accordance with the number of times of reading of a single sheet of the adjustment chart, the whole control section 101 also determines a value of i_max which is the maximum value of the variable i. In the case where each half of each of both sides of an adjustment chart is read, the value of i_max is set to four (i_max=4)

Successively, the whole control section 101 reads out illustration image data with regard to a method of placing the adjustment chart and the measurement background sheet on the platen glass G for the i-th reading from the HDD 142. As a guidance for the method of placing the adjustment chart and the measurement background sheet on the platen glass G for the i-th reading, the whole control section 101 displays an illustration-indicated guidance screen 105G3 (FIG. 14) (a guidance screen 105G3 on which illustrations are indicated) on the operation display section 105 (Step S105 in FIG. 11).

Figure 14:
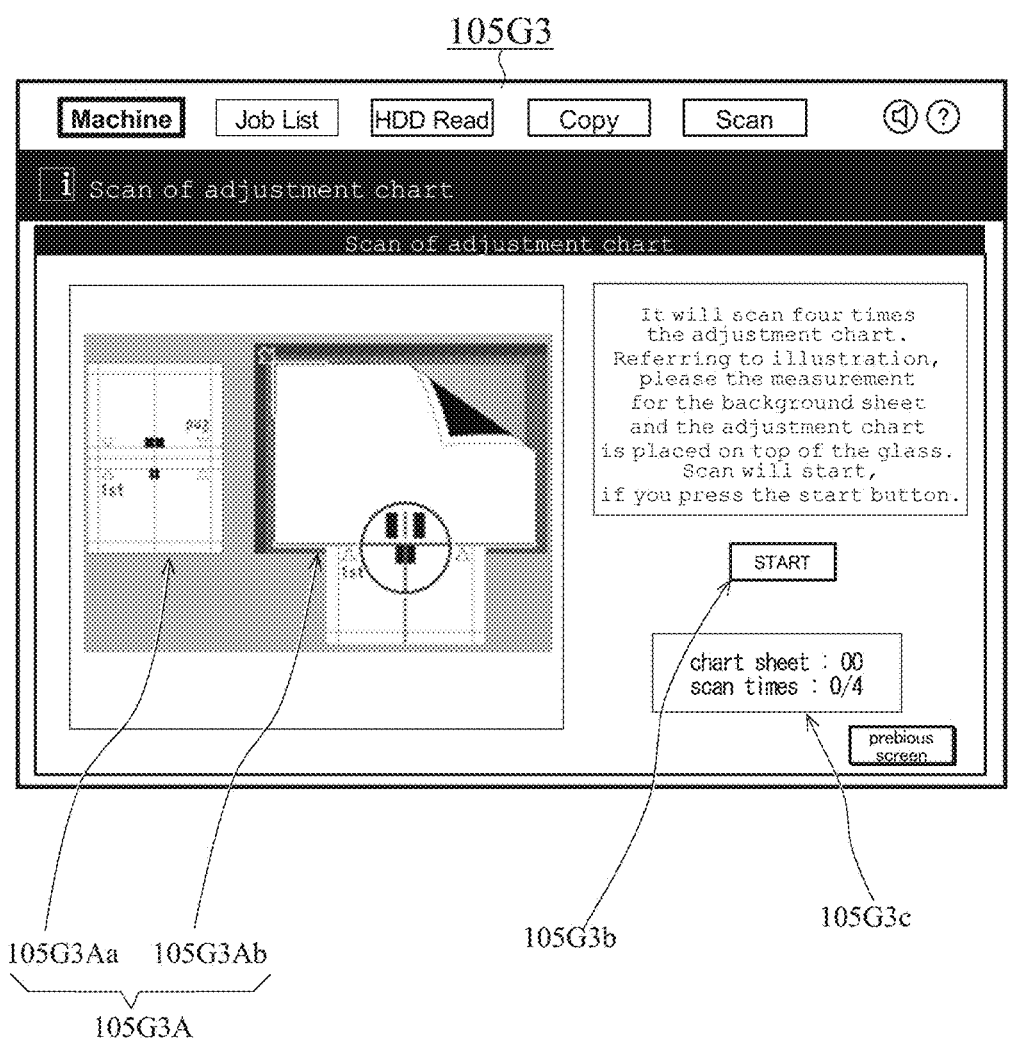
FIG. 14 is an explanatory drawing showing a situation of a display screen.

The guidance screen 105G3 shown in FIG. 14 incudes at least an illustration 105G3A (an orientation indicating illustration 105G3Aa and an overlap state illustration 105G3Ab) and a start button 105G3b.

Further, in order to clarify the progress situation of the reading, the guidance screen 105G3 shown in FIG. 14 may display indication 105G3c of the number of times with regard to the number of times by which the adjustment chart has been read normally and the total number of times by which the adjustment chart is to be read.

Herein, the orientation indicating illustration 105G3Aa is an illustration showing an appearance, viewed from the operator side, of a opposite surface of the adjustment chart opposite to a read surface at the time of reading the adjustment chart multiple times by changing the read surface to the front surface or the back surface or by changing the orientation of the read surface. That is, it becomes clear that it is good to place this surface of the adjustment chart with this orientation when viewing from an operator.

Further, the overlap state illustration 105G3Ab is an illustration showing an appearance, viewed from the operator side, of a opposite surface of the adjustment chart opposite to a read surface at the time of overlapping further the measurement background sheet on the adjustment chart placed on the platen glass G.

Further, it is preferable for the illustration 105G3A (the orientation indicating illustration 105G3Aa and the overlap state illustration 105G3Ab) to be made to an illustration in which a part of the opposite surface of the adjustment chart opposite to the read surface is emphasized or to an illustration in which a part of the appearance where the measurement background sheet is overlapped on the adjustment chart is emphasized.

The emphasizing means a state where a specific portion is enlarged than the other portions, a state where the density level or color of a specific portion is indicated higher or deeper than the other portions, a state where characters or lines in a specific portion are indicated thicker than the other portions, and the like.

That is, the illustration image data in which the adjustment chart and the measurement background sheet are drawn as an illustration as mentioned above, or the illustration image data in which the adjustment chart and the measurement background sheet are drawn as an illustration by being partially emphasized as mentioned above are memorized in the HDD 142 and the like.

Preferable examples of a portion to be emphasized in an illustration include a region including various marks showing a surface, an orientation, or an order, such as the vicinity of the chart read position indication mark "MarkIndicate", the vicinity of the chart reading order indication "DispIndicate", and the vicinity of the chart reading order indication "OrderIndicate" in the adjustment chart, and the vicinity of a portion where the center line "PBK2CL" of the measurement background sheet is made to coincide with the center line "LineCenterLong" in the long side direction of the adjustment chart.

Figure 15:
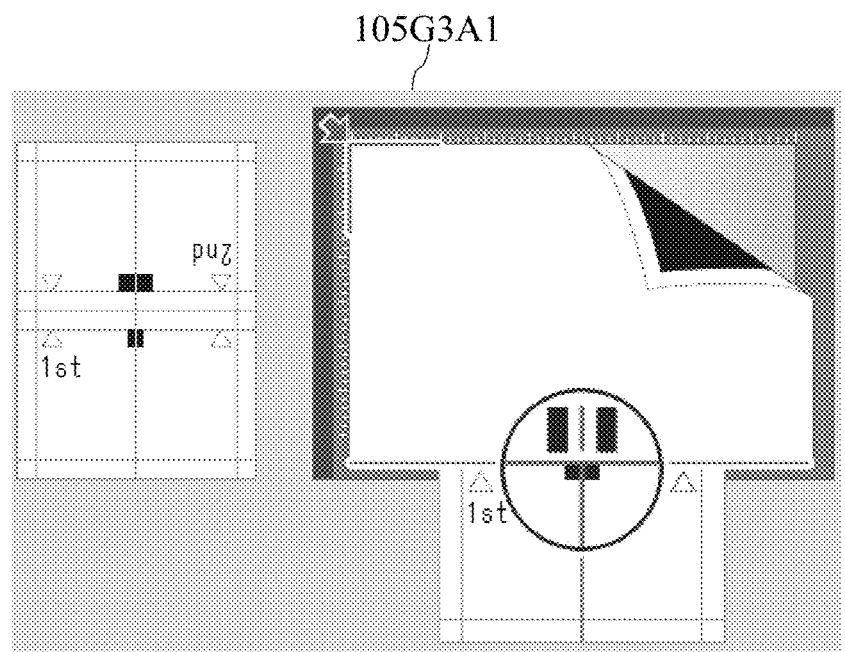
FIG. 15 is an explanatory drawing showing a situation of a display screen.
Figure 16:
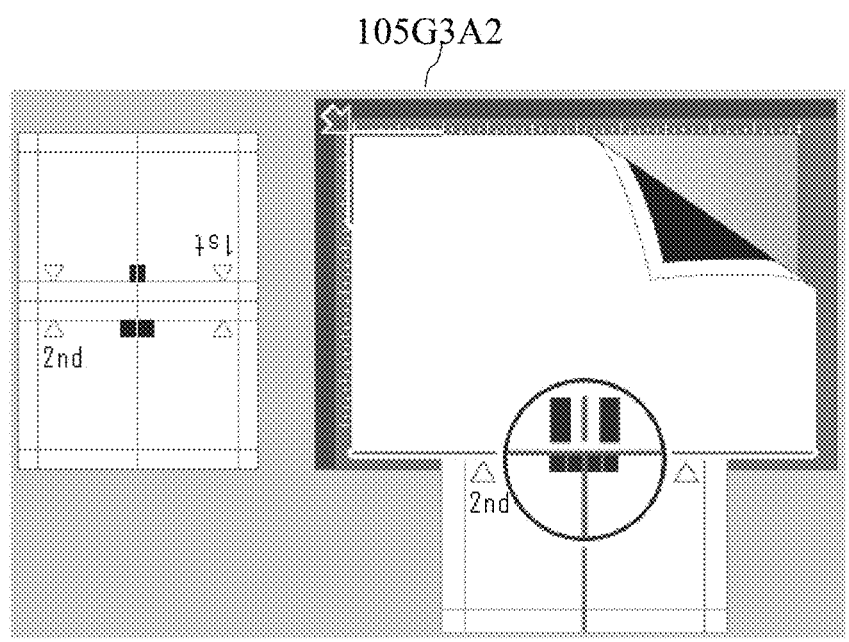
FIG. 16 is an explanatory drawing showing a situation of a display screen.
Figure 17:
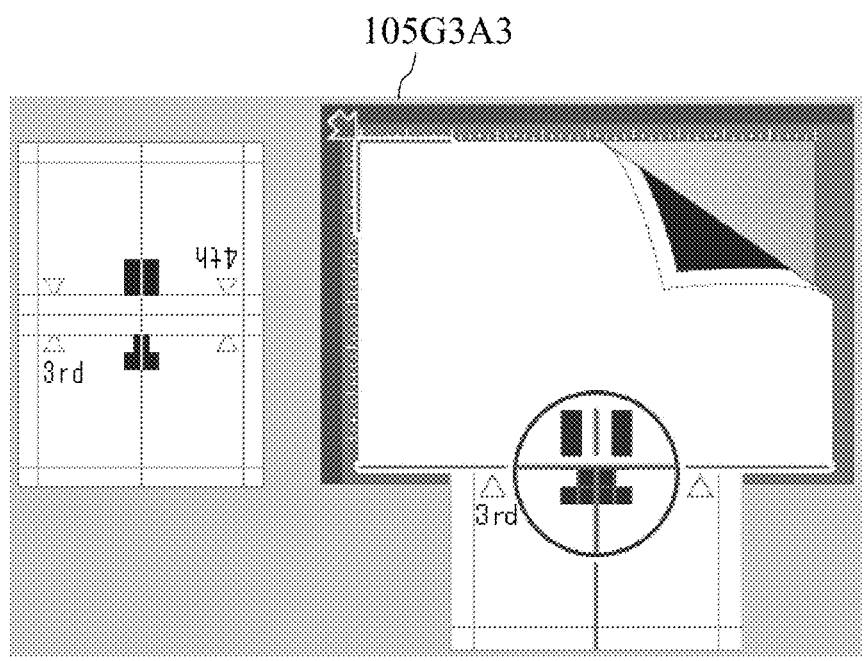
FIG. 17 is an explanatory drawing showing a situation of a display screen.
Figure 18:
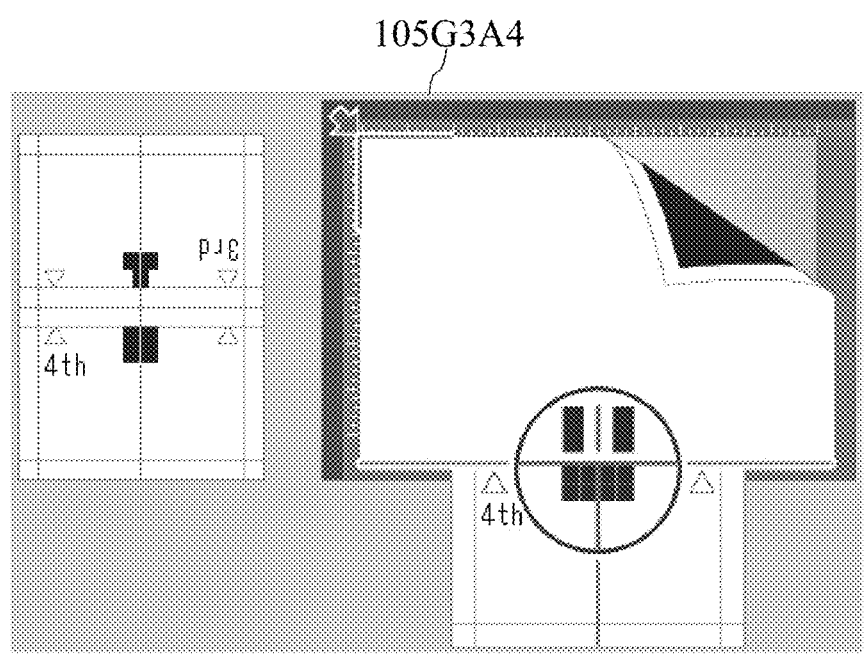
FIG. 18 is an explanatory drawing showing a situation of a display screen.

FIG. 15 shows an illustration 105G3A1 showing a state of each of the adjustment chart and the measurement background sheet at the time of the first reading (i=1). FIG. 16 shows an illustration 105G3A2 showing a state of each of the adjustment chart and the measurement background sheet at the time of the second reading (i=2). FIG. 17 shows an illustration 105G3A3 showing a state of each of the adjustment chart and the measurement background sheet at the time of the third reading (i=3). FIG. 18 shows an illustration 105G3A4 showing a state of each of the adjustment chart and the measurement background sheet at the time of the fourth reading (i=4).

Herein, the illustration shows an appearance viewed from the operator side with regard to the orientation indicating illustration 105G3A*a* and the overlap state illustration 105G3A*b*. However, the present invention should not be limited to this example. For example, an illustration may be made to show a read surface which cannot be seen from an operator, and a description "Please make this surface face downward" may be added.

With reference to the indication (Step S105 in FIG. 11) on the illustration-indicated guidance screens 105G3 (FIG. 14) in the operation display section 105, the operator places the adjustment chart on the platen glass G as shown in FIG. 5 (Step S106 in FIG. 11), and successively places the measurement background sheet while overlapping and positioning the measurement background sheet on the adjustment chart as shown in FIG. 10 (Step S107 in FIG. 11).

With the illustration based on the operator's eye level, the operator can place the adjustment chart correctly in accordance with the illustration. Further, in accordance with the illustration, the operator can place and overlap the measurement background sheet on the adjustment chart in a state of being positioned correctly.

Further, with the illustration which is based on the operator's eye level and partially emphasized, the operator can place the adjustment chart correctly in accordance with the illustration. Further, with the partially-emphasized illustration, the operator can place and overlap the measurement background sheet on the adjustment chart in accordance with the illustration in a state of being positioned correctly.

Further, by enlarging a region including various marks showing a surface, an orientation, or an order on the adjustment chart and the measurement background sheet, it also becomes possible to prevent the mistake of the operator, such as misrecognition and overlooking.

After the operator has placed the adjustment chart and the measurement background sheet on the platen glass G in accordance with the illustration-indicated guidance screen 105G3 (FIG. 14) as mentioned above, the operator depresses the start button 105G3*b* (Step S108 in FIG. 11).

In response to the depression operation for the start button 105G3*b*, the whole control section 101 controls the scanner section 120 to read the adjustment chart (Step S109 in FIG. 11). Upon receipt of the control of the whole control section 101, the scanner section 120 reads the adjustment chart on the platen glass G, and produces adjustment image data.

The whole control section 101 analyzes the adjustment image data, and acquires the inclination of the adjustment chart on the platen glass G, the number of marks in the chart reading order indication "OrderIndicate", and a distance of each of the measurement points "PointMeasure" (one place at an intersection point where the line "LineIn" intersects with the center line "LineCenterLong" in the long side direction and two places at intersection points where the two lines "LineIn" intersect with the center line "LineCenterShort" in the short side direction) from the respective ends of the sheet (Step S110 in FIG. 11).

Herein, if the inclination of the adjustment chart exists on the platen glass G, the whole control section 101 judges it as an error, (Step S111 in FIG. 11). Further, in the case where the number of marks on the chart reading order indication "OrderIndicate" differs from the number defined beforehand, the whole control section 101 judges it as an error, (Step S111 in FIG. 11). For example, at the time of the first reading for the adjustment chart, since the chart reading order indication "OrderIndicate" for the opposite surface exists, three pieces or four pieces per one group is the number defined beforehand as the number of marks.

When an error does not occur in the reading of the adjustment chart (NO at Step S111 in FIG. 11), the whole control section 101 increments the variable i of the number of times of reading of the adjustment chart one by one (Step S113 in FIG. 11) until the variable i of the number of times of reading of the adjustment chart reaches the maximum value i_max (YES at Step S112 in FIG. 11).

Further, the whole control section 101 controls so as to repeat displaying of the illustration-indicated guidance screen 105G3 (FIG. 14) for the i-th reading (Step S105 in FIG. 11), producing of the adjustment image data by reading the adjustment chart at the i-th reading (Step S109 in FIG. 11), and analyzing and error judgment of the adjustment image data at the i-th reading (Steps S110 and S111 in FIG. 11).

Herein, if an error has occurred in the reading of the adjustment chart (NO at Step S111 in FIG. 11), the whole control section 101 interrupts the analysis of the measurement point "PointMeasure", reads out the analysis result of the adjustment image data having caused such an error judgment and illustration image data corresponding to the error elimination measure from the HDD 142 and the like, and displays illustration on the operation display section 105 (Step S114 in FIG. 11).

Herein, as the analysis result of the adjustment image data having caused an error judgment, inclination of the adjustment chart on the platen glass G, a position deviation of the adjustment chart in the vertical direction and the lateral direction, abnormalities of the adjustment chart (print failure), mistakes in the reading order of the adjustment chart, etc. correspond to. Further, as the error elimination measure of the adjustment image data having caused an error judgment, placement of the adjustment chart at a normal angle on the platen glass G, placement of the adjustment chart at a normal position, reprint of a normal adjustment chart, placement of the adjustment chart in the right reading order, etc. correspond to.

Figure 19:
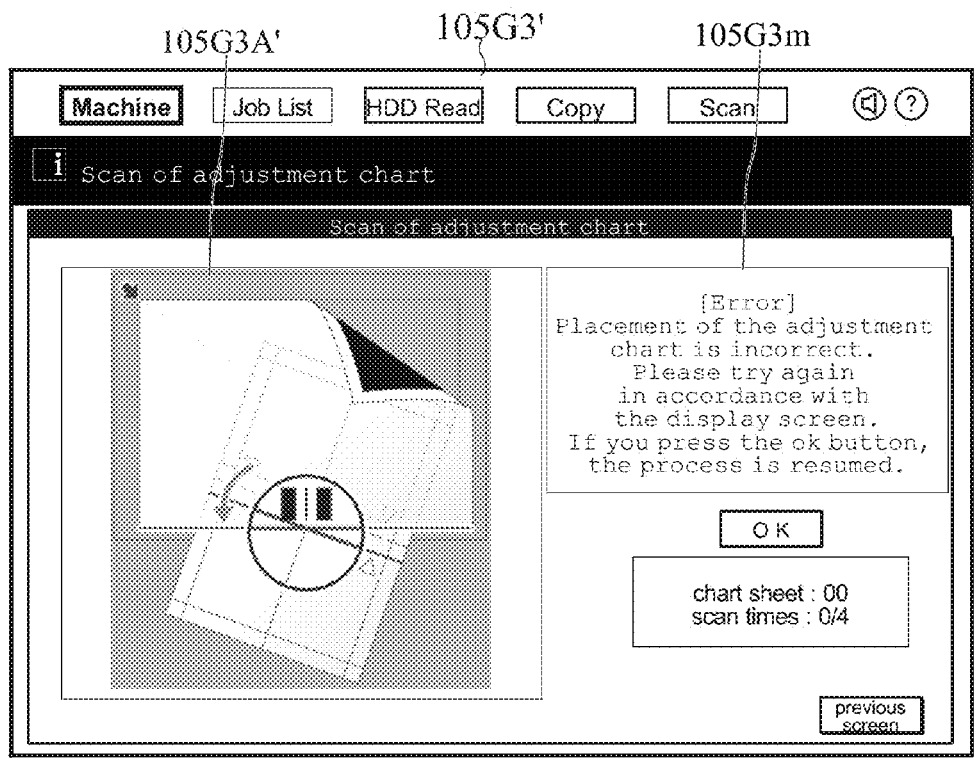
FIG. 19 is an explanatory drawing showing a situation of a display screen.

The guidance screen 105G3' shown in FIG. 19 shows a specific example of indication of an error elimination illustration 105G3A corresponding to the analysis result of the adjustment image data having caused an error judgment and an error elimination measure for it. Herein, the illustration shows a state where the adjustment chart rotates to the right, and as the error elimination measure for it, the illustration shows an arrow mark to instruct to rotate in the left direction. Further, on the error elimination guidance screen 105G3' shown in FIG. 19, as the error elimination message 105G3m, the following messages are displayed. "<Error> A method of placing an adjustment chart is wrong. Please replace it in accordance with the screen. When [OK] is depressed, the processing will be resumed."

In the case of the error elimination illustration 105G3A' shown in FIG. 19, although the surface and region of the adjustment chart are made in agreement with requirements, an error occurs in that the adjustment chart inclines in the right rotation direction in view of the operator's eye level. Then, the illustration is prepared in order to eliminate such an error by rotating such an inclination in the left rotation direction in view of the operator's eye level. For this reason, the orientation indicating illustration 105G3Aa does not exist, and the illustration is made to correspond to the overlap state illustration 105G3Ab.

On the error elimination illustration 105G3A', the various auxiliary lines, various center lines, etc. of the adjustment chart which are covered with the measurement background sheet and are supposed to be invisible are made in a state of being displayed with a light color, which clarifies the cause of an error and an error eliminating technique.

Successively, when the operator replaces the adjustment chart in accordance with the illustration and depresses an OK button (YES at Step S115 in FIG. 11), displaying (Step S105 in FIG. 11) of the guidance screen 105G3 by the illustration of a method of placing the adjustment chart and the measurement background sheet on the platen glass G for the i-th reading and the following steps are repeated.

Figure 20:
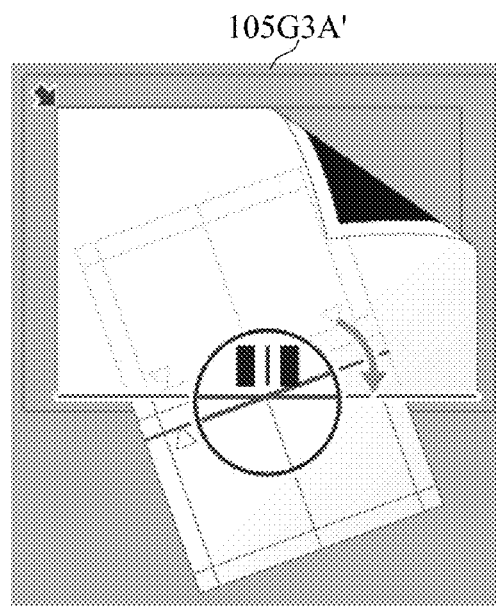
FIG. 20 is an explanatory drawing showing a situation of a display screen.

In the ease of the error elimination illustration 105G3A' shown in FIG. 20, although the surface and region of the adjustment chart are made in agreement with requirements, an error occurs in that the adjustment chart inclines in the left rotation direction in view of the operator's eye level. Then, the illustration is prepared in order to eliminate such an inclination by rotating in the right rotation direction in view of the operator's eye level. For this reason, the orientation indicating illustration 105G3Aa does not exist, and the illustration is made to correspond to the overlap state illustration 105G3Ab.

Figure 21:
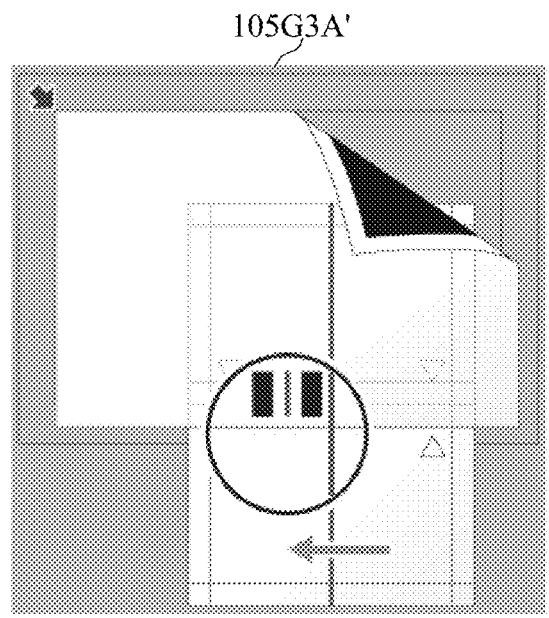
FIG. 21 is an explanatory drawing showing a situation of a display screen.

In the case of the error elimination illustration 105G3A' shown in FIG. 21, although the surface and region of the adjustment chart are made in agreement with requirements, an error occurs in that the adjustment chart shifts to the right direction in view of the operator's eye level. Then, the illustration is prepared in order to eliminate such a shift by moving in the left direction in view of the operator's eye level. For this reason, the orientation indicating illustration 105G3Aa does not exist, and the illustration is made to correspond to the overlap state illustration 105G3Ab.

Figure 22:
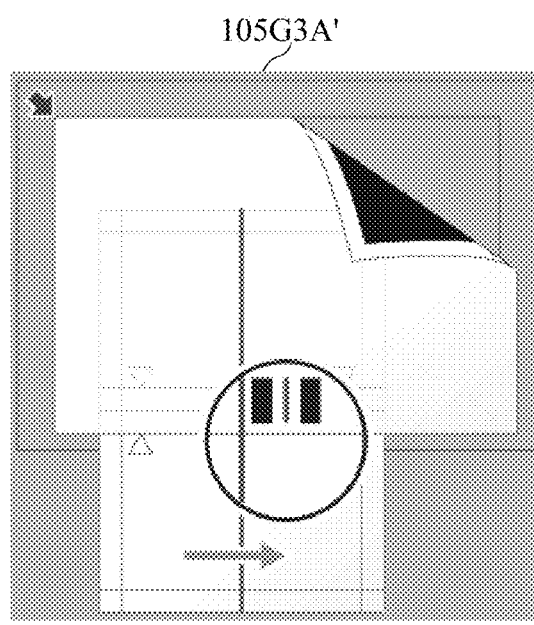
FIG. 22 is an explanatory drawing showing a situation of a display screen.

In the case of the error elimination illustration 105G3A' shown in FIG. 22, although the surface and region of the adjustment chart are made in agreement with requirements, an error occurs in that the adjustment chart shifts to the left direction in view of the operator's eye level. Then, the illustration is prepared in order to eliminate such a shift by moving in the right direction in view of the operator's eye level. For this reason, the orientation indicating illustration 105G3Aa does not exist, and the illustration is made to correspond to the overlap state illustration 105G3Ab.

Figure 23:
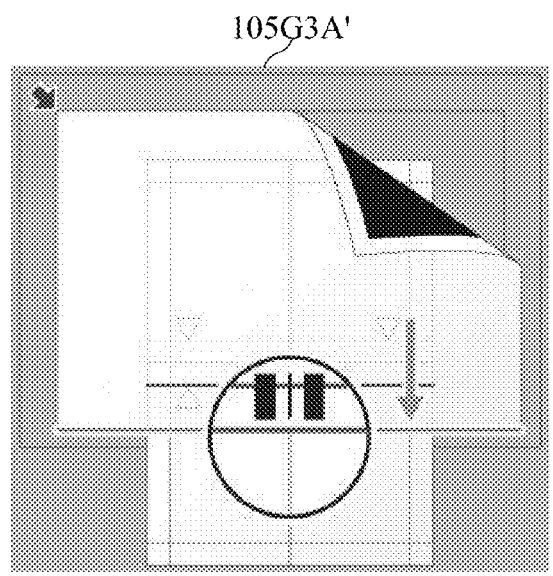
FIG. 23 is an explanatory drawing showing a situation of a display screen.

In the case of the error elimination illustration 105G3A' shown in FIG. 23, although the surface and region of the adjustment chart are made in agreement with requirements, an error occurs in that the adjustment chart shifts to the rear direction (in the illustration, to the upper direction) in view of the operator's eye level. Then, the illustration is prepared in order to eliminate such a shift by moving in the front direction (in the illustration, to the lower direction) in view of the operator's eye level. For this reason, the orientation indicating illustration 105G3Aa does not exist, and the illustration is made to correspond to the overlap state illustration 105G3Ab.

Figure 24:
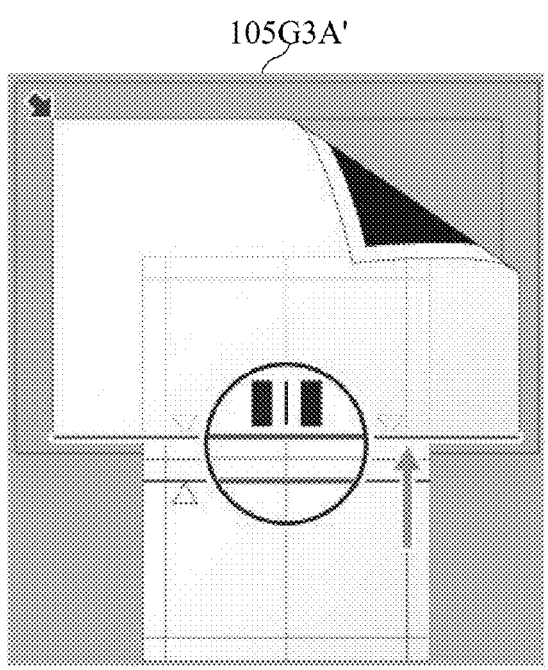
FIG. 24 is an explanatory drawing showing a situation of a display screen.

In the case of the error elimination illustration 105G3A' shown in FIG. 24, although the surface and region of the adjustment chart are made in agreement with requirements, an error occurs in that the adjustment chart shifts to the front direction (in the illustration, to the lower direction) in view of the operator's eye level. Then, the illustration is prepared in order to eliminate such a shift by moving in the rear direction (in the illustration, to the upper direction) in view of the operator's eye level. For this reason, the orientation indicating illustration 105G3Aa does not exist, and the illustration is made to correspond to the overlap state illustration 105G3Ab.

Figure 25:
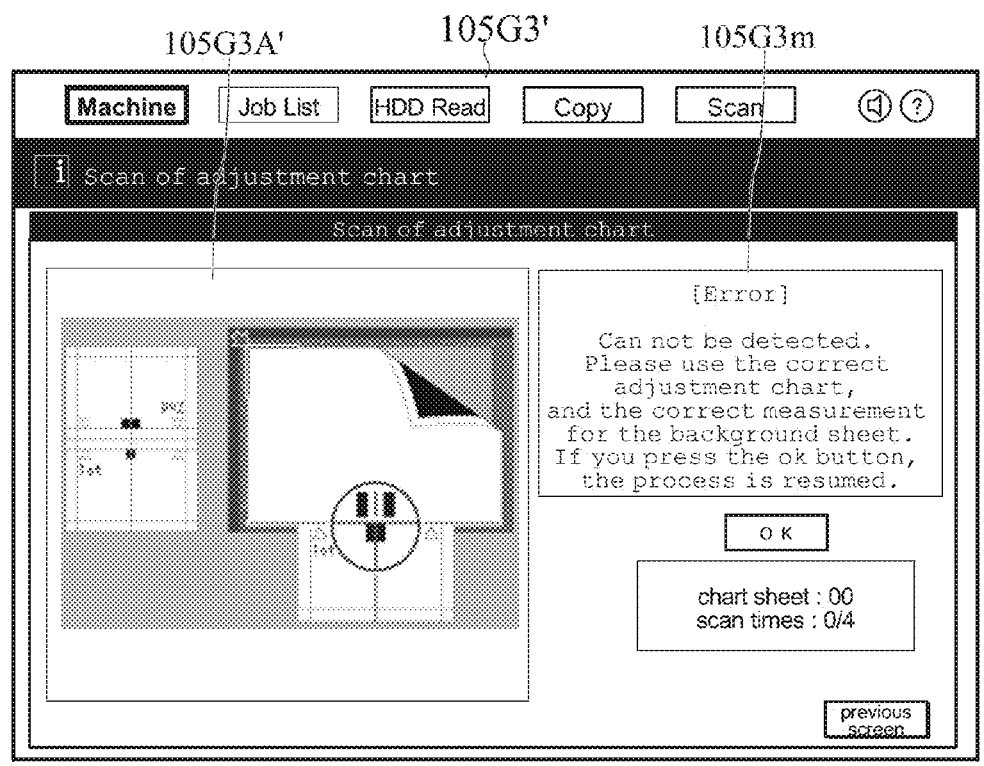
FIG. 25 is an explanatory drawing showing a situation of a display screen.

The guidance screen 105G3' shown in FIG. 25 shows a case where an error, such as adjustment chart edge detection failure and line detection failure occurs. In this case, there is a possibility that the adjustment chart or the measurement background sheet may not be right. Then, on the guidance screen 105G3' shown in FIG. 25, an error elimination illustration 105G3A' in a state where the right adjustment chart and the right measurement background sheet are used and an error elimination message 105G3m are displayed. As the error elimination message 105G3m, the following messages are displayed. "<Error> Detection cannot be achieved. Please use a right adjustment chart and a right measurement background sheet. When [OK] is depressed, the processing will be resumed."

Figure 26:
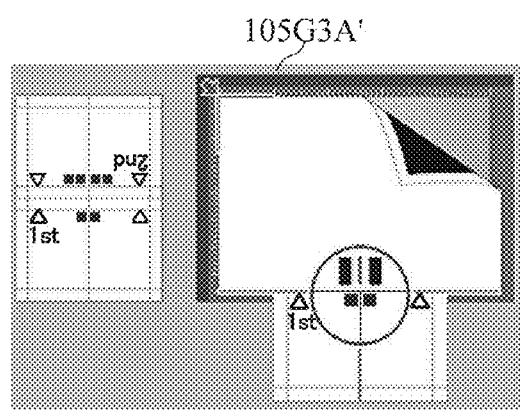
FIG. 26 is an explanatory drawing showing a situation of a display screen.

The case of the error elimination illustration 105G3A' shown in FIG. 26 is the case where the chart reading order is judged as being different based on the number of marks on the chart reading order indication "OrderIndicate". That is, an error is that the surface or region of the adjustment chart is not made in agreement with requirements. Then, in order to eliminate the mistake in the chart reading order, the illustration is made to include both of the orientation indicating illustration 105G3Aa and the overlap state illustration 105G3Ab.

Examples of a portion to be emphasized in the error elimination illustration include various mark regions which indicate a surface, an orientation and an order in the adjustment chart, such as the chart read position indication mark "MarkIndicate", the chart reading order indication "DispIndicate", and the chart reading order indication "OrderIndicate" in the adjustment chart.

Figure 27:
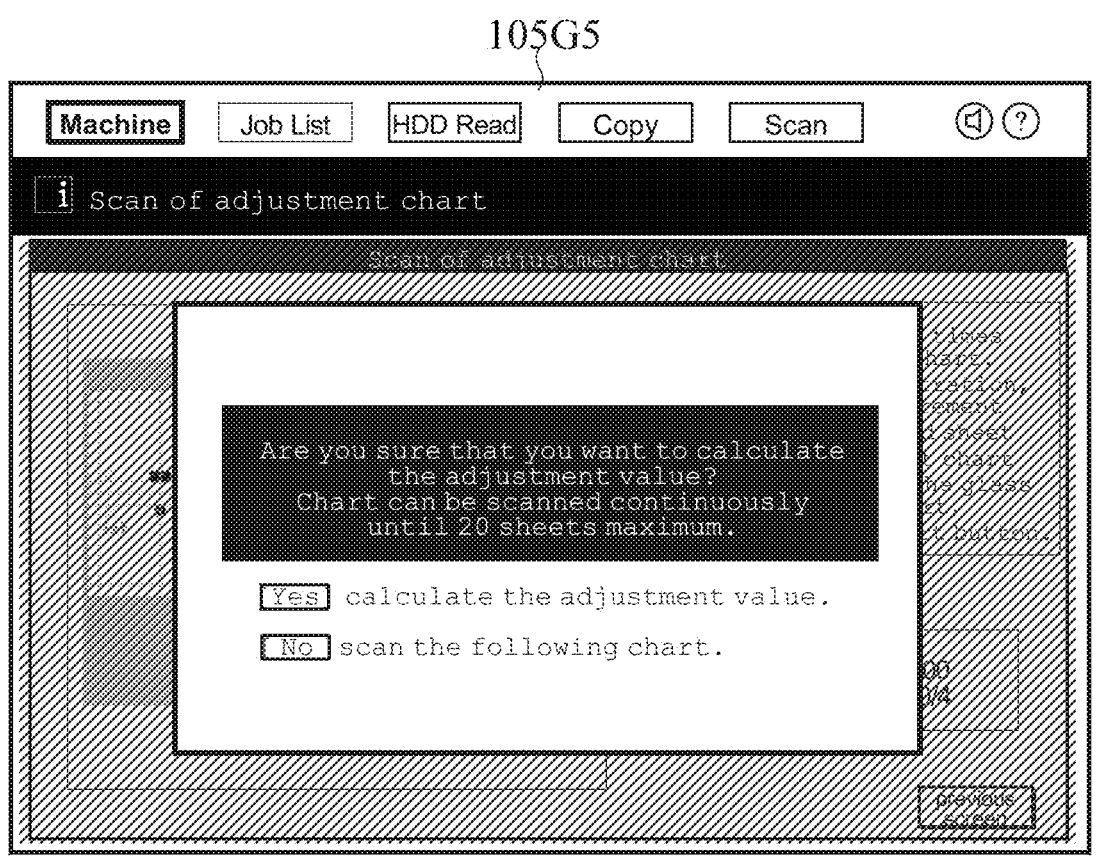
FIG. 27 is an explanatory drawing showing a situation of a display screen.

Subsequently, when the variable i of the number of times of reading of the adjustment chart reaches the maximum value i_max (NO at Step S112 in FIG. 11), that is, when the reading of each of the regions of each of the both sides of the adjustment chart has been completed, the whole control section 101 displays an adjustment confirmation screen 105G5 shown in FIG. 27 on the operation display section 105 (Step S116 in FIG. 11).

In the adjustment confirmation, the intention of the operator is confirmed with regard to the following two points. In the first point, whether a front-back adjustment (adjustment a position deviation between a front image and a back image) is executed based on the analysis result, at a current time, of the adjustment image data obtained from each of the regions of each of both sides of the adjustment chart by a series of the reading as mentioned above. Alternatively, in the second point, whether a front-back adjustment (adjustment a position deviation between a front image and a back image) is executed based on the average value of the analysis results obtained by executing repeatedly further the reading of the adjustment image of i_max times in the above.

In this adjustment confirmation screen 105G5, an adjustment confirmation window 10565a which asks whether to calculate an adjustment value is displayed. In the case where the operator clicks "NO" in accordance with the adjustment confirmation window 105G5a (NO at Step S117 in FIG. 11), the whole control section 101 returns the variable i with regard to the number of times of reading of the adjustment chart to the initial value 1 (Step S104 in FIG. 11). Successively, the whole control section 101 repeats "displaying of the guidance" to "reading of the adjustment chart" to "analyzing of the adjustment image data" until the variable i reaches the maximum value i_max as mentioned above (Step S105~in FIG. 11).

In the case where the operator clicks "YES" in accordance with the adjustment confirmation window 105G5a (YES at Step S117 in FIG. 11), the whole control section 101 calculates an adjustment value based on the analysis results (an error between the front surface and the back surface in the measurement values of the measurement points "Point-Measure" obtained by each reading) of the adjustment image data obtained from each of the regions of each of both sides of the adjustment chart as mentioned above, and executes a front-back adjustment (position deviation adjustment between a front image and a back image) based on the adjustment value (Step S118 in FIG. 11).

In the case where the reading of the adjustment chart up to the maximum value of i_max is executed repeatedly by multiple times, the whole control section 101 calculates the adjustment value after averaging the measurement values of the measurement points "PointMeasure" obtained by each reading, and executes a front-back adjustment (position deviation adjustment between a front image and a back image) based on the adjustment value (Step S118 in FIG. 11). In this case, by averaging the results of the reading in the multiple times, it becomes possible to reduce the influence of errors at the time of the reading.

With the operations in the above ways, the whole control section 101 ends the front-back adjustment processing of the present embodiment (End in FIG. 11).

Other Embodiments

In the above description, the illustration image corresponding to the analysis result of the adjustment chart is displayed on the operation display section 105 of the image forming apparatus 100. However, the present invention should not be limited to the above example.

For example, the image data of the illustration image corresponding to the analysis result of the adjustment chart is selected, display image data are produced from the image data, and the display image data may be transmitted to an external display device of the image forming apparatus 100.

Further, another image formation control device different from the whole control section 101 of the image forming apparatus 100 may perform control of the above-mentioned operation. Such another image formation control device may be a control device for exclusive use, or may be a computer in which an image formation control program is installed.

Further, in the above description, four places (i_max=4) in total at both ends in the long side direction on a sheet are made as a specific example of the measurement points of the front-back adjustment. However, the present invention should not be limited to the above example. For example, the front-back adjustment may be perform based on two places in total only at leading end regions or only at trailing end regions in the long side direction on both sides of a sheet.

Further, the reading of the adjustment chart should not be limited to both sides. That is, even in the case where different regions on one side of the adjustment chart are read separately by multiple times, or even in the case where a partial region on one side of the adjustment chart is read only one time, it is possible to perform displaying of the guidance by the illustration mentioned above.

Further, the various auxiliary lines, the various center lines, etc. of the adjustment chart shown in FIG. 3 and FIG. 4 are one example. The present invention should not be limited to the above example. Further, the screen constitution of the display screen and the contents of the message shown in FIG. 14 to FIG. 25 are also one example. The present invention should not be limited to the contents.

Further, the contents of the errors shown in FIG. 19 to FIG. 25 are also one example. The present invention should not be limited to the contents. Further, in the case where the image forming system 1 is connected an image reading apparatus independent of the image forming apparatus 100, a maximum image-formation possible size of the image forming apparatus 100 may not coincide with a maximum readable size of the image reading apparatus.

In such a case, the maximum size may be made to coincide with a smaller size between them.

Effects Acquired by the Embodiment

Hereafter, description is given to the effects acquired by the image forming apparatus, the image forming system, and the image formation control method according to the present embodiment.

(1) In this embodiment, at the time of reading and analyzing the adjustment chart obtained by image formation and adjusting the image forming section based on the analysis result, an illustration image corresponding to the analysis result of the read adjustment chart is selected, and the selected illustration image are displayed. With this, in the case of reading the adjustment chart and performing the various kinds of adjustment for the image forming apparatus, it becomes possible to perform the reading of the adjustment chart appropriately.

(2) In the above (1), at the time of executing a series of adjustment by reading multiple places on the adjustment chart separately by multiple times, if the analysis result of the adjustment image data is normal, illustration image data corresponding to the next reading is selected, and the selected illustration image data are displayed. Further, at the time of executing a series of adjustment by reading multiple places on the adjustment chart separately by multiple times, if the analysis result of the adjustment image data is an error, illustration image data corresponding to the next rereading of the same places is selected, and the selected illustration image data are displayed. With this, in the case of reading the adjustment chart and performing the various kinds of adjustment for the image forming apparatus, the illustration image data corresponding to the next reading or the illustration image data corresponding to the same reading are displayed in accordance with the result of the reading of the adjustment chart, whereby it becomes possible to perform the reading of the adjustment chart appropriately.

(3) In the above (1) to (2), at the time of placing an opposite surface opposite to a read surface of the adjustment chart, i.e., the adjustment chart on the reading section, a state of a surface becoming an outside which is viewed from an operator is displayed as an illustration. As a result, the operator can perform placement of the adjustment chart appropriately in accordance with the illustration. With this, it becomes possible to execute appropriately the reading of the adjustment chart placed correctly. Further, it also becomes possible to prevent the mistake of the operator, such as misrecognition and overlooking, by displaying the state viewed from the operator as the illustration.

(4) In the above (1) to (3), at the time of placing an illustration where a part of an opposite surface opposite to a read surface of the adjustment chart is emphasized, i.e., the adjustment chart on the reading section, in a state of a surface becoming an outside which is viewed from an operator, a state where a partial region is emphasized is displayed as an illustration. As a result, the operator can perform placement of the adjustment chart appropriately in accordance with the illustration. With this, it becomes possible to execute appropriately the reading of the adjustment chart placed correctly. Further, it also becomes possible to prevent the mistake of the operator, such as misrecognition and overlooking, by displaying a partial region by enlarging it in the illustration of the state viewed from the operator.

(5) In the above (1) to (4), in the case where the adjustment image data are analyzed and an error is detected, since an illustration in which a situation of the reading of the adjustment chart is drawn is displayed so as to eliminate the error, replacement of the adjustment chart is performed appropriately so as to eliminate the error, whereby it becomes possible to perform the reading appropriately.

(6) In the above (1) to (5), the adjustment chart is read by any one of the image reading device included in the image forming apparatus and the image reading device constituted so as to be able to communicate with the image forming apparatus or the image forming system, and then adjustment image data are produced. Accordingly, it becomes possible to read the adjustment chart appropriately by any one of the image reading devices, and to perform the various kinds of adjustment of the image forming apparatus.

(7) In the above (1) to (6), at the time of performing a series of adjustment by reading multiple places on the adjustment chart separately by multiple times, the number of times of reading the adjustment chart normally is displayed, whereby it becomes possible to grasp easily the progress situation of reading of the adjustment chart. Accordingly, it becomes possible to read the adjustment chart appropriately, and to perform the various kinds of adjustment of an image forming apparatus.

What is claimed is:

1. An image forming apparatus comprising:
    an image forming section which performs image formation based on image data,
    a control section which controls the image formation in the image forming section, and
    a memory section which memorizes a plurality of illustration image data drawn correspondingly to reading of an adjustment chart,
    wherein the control section controls so as to: (i) perform the image formation for the adjustment chart in the image forming section, (ii) analyze adjustment image data produced by reading in an image reading section, the adjustment chart on which a measurement background sheet coated with a solid black is placed, (iii) select at least one of the plurality of illustration image data corresponding to an analysis result of the adjustment image data at a time of adjusting the image forming section based on the analysis result, and (iv) display the selected at least one of the plurality of illustration image data on a display section,
    wherein to produce the adjustment image data, the measurement background sheet coated with the solid black is placed on the adjustment chart so as to face the adjustment chart in the image reading section and so that a center position mark of the measurement background sheet faces a region of the adjustment chart which protrudes from the image reading section,
    wherein the selected at least one of the plurality of illustration image data includes guidance screen data in which the adjustment chart and the measurement background sheet are drawn and displayed for illustrating placement of the adjustment chart and the measurement background sheet on the image reading section, and
    wherein when it is determined that an error has occurred in the reading of the adjustment chart by analyzing the adjustment image data, the displayed guidance screen data includes error elimination illustration data for illustrating an error elimination measure.

2. The image forming apparatus described in claim 1, wherein at a time of reading multiple places on the adjustment chart separately by multiple times in the image reading section, if the analysis result of the adjustment image data is normal, the control section controls so as to select one of the plurality of illustration image data corresponding to a next reading, and produce display data of the selected illustration image data, and if the analysis result of the adjustment image data is an error, the control section controls so as to select one of the plurality of illustration image data corresponding to a rereading of a same portion, and produce display data of the selected illustration image data.

3. The image forming apparatus described in claim 1, wherein the memory section memorizes the plurality of illustration image data so that an opposite surface opposite to a read surface of the adjustment chart is drawn as an illustration.

4. The image forming apparatus described in claim 1, wherein the memory section memorizes the plurality of illustration image data so that a part of an opposite surface opposite to a read surface of the adjustment chart is drawn as an illustration by being emphasized.

5. The image forming apparatus described in claim 1, wherein in the case where an error is detected by analyzing the adjustment image data, the control section controls so as to read out from the memory section one of the plurality of illustration image data so that a situation of the reading of the adjustment chart is drawn as an illustration so as to eliminate the error, and to produce display data of the read out illustration image data.

6. The image forming apparatus described in claim 1, wherein the adjustment image data is produced by the image reading section by reading the adjustment chart output by image formation of the image forming section and the measurement background sheet placed on the adjustment chart.

7. The image forming apparatus described in claim 1, wherein at a time of reading multiple places on the adjustment chart separately by multiple times in the image reading section, the control section controls so as to produce display image data including a number of times of reading of the adjustment chart.

8. An image forming apparatus comprising:
   an image forming section which performs image formation based on image data,
   a control section which controls the image formation in the image forming section,
   a image reading section which reads an adjustment chart output by image formation of the image forming section and reads a measurement background sheet coated with a solid black placed on the adjustment chart so as to produce adjustment image data and which supplies the adjustment image data to the control section, and
   a memory section which memorizes a plurality of illustration image data drawn correspondingly to the reading of the adjustment chart,
   wherein the control section controls so as to: (i) perform the image formation for the adjustment chart in the image forming section, (ii) analyze the produced adjustment image data, (iii) select at least one of the plurality of illustration image data corresponding to an analysis result of the adjustment image data at a time of adjusting the image forming section based on the analysis result, and (iv) display the selected at least one of the plurality of illustration image data on a display section,
   wherein to produce the adjustment image data, the measurement background sheet coated with the solid black is placed on the adjustment chart so as to face the adjustment chart in the image reading section and so that a center position mark of the measurement background sheet faces a region of the adjustment chart which protrudes from the image reading section,
   wherein the selected at least one of the plurality of illustration image data includes guidance screen data in which the adjustment chart and the measurement background sheet are drawn and displayed for illustrating placement of the adjustment chart and the measurement background sheet on the image reading section, and
   wherein when it is determined that an error has occurred in the reading of the adjustment chart by analyzing the adjustment image data, the displayed guidance screen data includes error elimination illustration data for illustrating an error elimination measure.

9. The image forming apparatus described in claim 8, wherein at a time of reading multiple places on the adjustment chart separately by multiple times in the image reading section, if the analysis result of the adjustment image data is normal, the control section controls so as to select one of the plurality of illustration image data corresponding to a next reading, and to display the selected illustration image data on the display section, and if the analysis result of the adjustment image data is an error, the control section controls so as to select one of the plurality of illustration image data corresponding to a rereading of a same portion, and to display the selected illustration image data on the display section.

10. The image forming apparatus described in claim 8, wherein the memory section memorizes the plurality of illustration image data so that an opposite surface opposite to a read surface of the adjustment chart is drawn as an illustration.

11. The image forming apparatus described in claim 8, wherein the memory section memorizes the plurality of illustration image data so that a part of an opposite surface opposite to a read surface of the adjustment chart is drawn as an illustration by being emphasized.

12. The image forming apparatus described in claim 8, wherein in the case where an error is detected by analyzing the adjustment image data, the control section controls so as to read out from the memory section one of the plurality of illustration image data so that a situation of the reading of the adjustment chart is drawn as an illustration so as to eliminate the error, and to display the read out illustration image data on the display section.

13. The image forming apparatus described in claim 8, wherein the image reading section is connected to the image forming section, or the image reading section is constituted so as to be able to communicate with the image forming section, and the adjustment image data is produced by the image reading section by reading the adjustment chart output by image formation of the image forming section and the measurement background sheet placed on the adjustment chart.

14. The image forming apparatus described in claim 8, wherein at a time of reading multiple places on the adjustment chart separately by multiple times, the control section controls to display a number of times of reading of the adjustment chart together with a selected illustration image data on the display section.

15. An image formation control method for controlling image formation, the method comprising:
   memorizing a plurality of illustration image data drawn correspondingly to reading of an adjustment chart in a memory section;
   performing image formation for the adjustment chart in an image forming section;
   analyzing adjustment image data produced by reading in an image reading section, the adjustment chart on which a measurement background sheet coated with a solid black is placed;
   selecting at least one of the plurality of illustration image data corresponding to an analysis result of the adjustment image data at a time of adjusting the image forming section based on the analysis result, and
   displaying the selected at least one of the plurality of illustration image data on a display section,
   wherein to produce the adjustment image data, the measurement background sheet coated with the solid black is placed on the adjustment chart so as to face the adjustment chart in the image reading section and so that a center position mark of the measurement background sheet faces a region of the adjustment chart which protrudes from the image reading section,
   wherein the selected at least one of the plurality of illustration image data includes guidance screen data in which the adjustment chart and the measurement background sheet are drawn and displayed for illustrating placement of the adjustment chart and the measurement background sheet on the image reading section, and wherein when it is determined that an error has occurred in the reading of the adjustment chart by analyzing the adjustment image data, the displayed guidance screen data includes error elimination illustration data for illustrating an error elimination measure.

16. The image formation control method described in claim 15, wherein at a time of reading multiple places on the adjustment chart separately by multiple times in the image reading section, if the analysis result of the adjustment image data is normal, one of the plurality of illustration image data corresponding to a next reading is selected, and the selected illustration image data is displayed on the display section, and if the analysis result of the adjustment image data is an error, one of the plurality of illustration image data corresponding to a rereading of a same portion is selected, and the selected illustration image data is displayed on the display section.

17. The image formation control method described in claim 15, wherein the memory section memorizes the plurality of illustration image data so that an opposite surface opposite to a read surface of the adjustment chart is drawn as an illustration.

18. The image formation control method described in claim 15, wherein the memory section memorizes the plurality of illustration image data so that a part of an opposite surface opposite to a read surface of the adjustment chart is drawn as an illustration by being emphasized.

19. The image formation control method described in claim 15, wherein in the case where an error is detected by analyzing the adjustment image data, one of the plurality of illustration image data is read out from the memory section so that a situation of the reading of the adjustment chart is drawn as an illustration so as to eliminate the error, and the read out illustration image data is displayed on the display section.

20. The image formation control method described in claim 15, wherein the adjustment chart is output by image formation at an image forming apparatus or an image forming system, and the adjustment image data is produced by reading the adjustment chart and the measurement background sheet placed on the adjustment chart by any one of the image reading section included in the image forming apparatus and the image reading section constituted to be able to communicate with the image forming apparatus or the image forming system.

21. The image formation control method described in claim 15, wherein at a time of reading multiple places on the adjustment chart separately by multiple times, a number of times of reading of the adjustment chart is displayed on the display section.

* * * * *